(12) United States Patent
Ikriannikov

(10) Patent No.: US 8,716,991 B1
(45) Date of Patent: May 6, 2014

(54) SWITCHING POWER CONVERTERS INCLUDING AIR CORE COUPLED INDUCTORS

(75) Inventor: Alexandr Ikriannikov, Castro Valley, CA (US)

(73) Assignee: Volterra Semiconductor Corporation, San Jose, CA (US)

( * ) Notice: Subject to any disclaimer, the term of this patent is extended or adjusted under 35 U.S.C. 154(b) by 506 days.

(21) Appl. No.: 13/037,238

(22) Filed: Feb. 28, 2011

(51) Int. Cl.
*G05F 1/59* (2006.01)

(52) U.S. Cl.
USPC .......................................... 323/272; 323/282

(58) Field of Classification Search
USPC ................................................ 323/272, 282
See application file for complete search history.

(56) References Cited

U.S. PATENT DOCUMENTS

| | | | |
|---|---|---|---|
| 4,223,360 A | 9/1980 | Sansom et al. | |
| 5,204,809 A | 4/1993 | Andresen | |
| 6,307,757 B1 | 10/2001 | Porter et al. | |
| 6,362,986 B1 | 3/2002 | Schultz et al. | |
| 6,545,450 B1 | 4/2003 | Ledenev et al. | |
| 6,686,727 B2 | 2/2004 | Ledenev et al. | |
| 6,696,823 B2 | 2/2004 | Ledenev et al. | |
| 6,784,644 B2 | 8/2004 | Xu et al. | |
| 7,157,891 B1 * | 1/2007 | Drury et al. | 323/282 |
| 7,199,695 B1 | 4/2007 | Zhou et al. | |
| 7,233,132 B1 | 6/2007 | Dong et al. | |
| 7,239,530 B1 | 7/2007 | Djekic et al. | |
| 7,280,025 B2 | 10/2007 | Sano | |
| 7,310,039 B1 | 12/2007 | Zhang | |
| 7,315,463 B2 | 1/2008 | Schrom et al. | |
| 7,317,305 B1 | 1/2008 | Stratakos et al. | |
| 7,352,269 B2 | 4/2008 | Li et al. | |
| 7,423,894 B2 | 9/2008 | Ilic | |
| 7,498,920 B2 | 3/2009 | Sullivan et al. | |
| 7,504,808 B2 | 3/2009 | Schrom et al. | |
| 7,755,463 B2 * | 7/2010 | Hopper et al. | 336/200 |
| 2002/0067234 A1 | 6/2002 | Kung | |
| 2006/0012348 A1 | 1/2006 | Zhao et al. | |
| 2006/0044101 A1 | 3/2006 | Frutschy et al. | |
| 2006/0197510 A1 | 9/2006 | Chandrasekaran | |
| 2007/0097571 A1 | 5/2007 | Dinh et al. | |
| 2007/0175701 A1 | 8/2007 | Xu et al. | |
| 2007/0176726 A1 | 8/2007 | Xu et al. | |

(Continued)

FOREIGN PATENT DOCUMENTS

| | | |
|---|---|---|
| EP | 1 835 604 | 9/2007 |
| JP | 11 307369 | 11/1999 |

OTHER PUBLICATIONS

Dong et al., Twisted Core Coupled Inductors for Microprocessor Voltage Regulators, Power Electronics Specialists Conference, pp. 2386-2392, Jun. 17-21, 2007.

(Continued)

*Primary Examiner* — Jeffrey Sterrett
(74) *Attorney, Agent, or Firm* — Lathrop & Gage LLP

(57) ABSTRACT

A switching power converter includes a first and second switching device, an air core coupled inductor, and a controller. The air core coupled inductor includes a first winding electrically coupled to the first switching device and a second winding electrically coupled to the second switching device. The first and second windings are magnetically coupled. The controller is operable to cause the first and second switching devices to repeatedly switch between their conductive and non-conductive states at a frequency of at least 100 kilohertz to cause current through the first and second windings to repeatedly cycle, thereby providing power to an output port. The switching power converter may have a topology including, but not limited to, a buck converter topology, a boost converter topology, and a buck-boost converter topology.

24 Claims, 16 Drawing Sheets

(56) References Cited

U.S. PATENT DOCUMENTS

| | | |
|---|---|---|
| 2007/0268104 A1 | 11/2007 | Chan et al. |
| 2008/0150666 A1 | 6/2008 | Chandrasekaran et al. |
| 2008/0205098 A1 | 8/2008 | Xu et al. |
| 2009/0001945 A1 | 1/2009 | Wickersham et al. |
| 2009/0040000 A1 | 2/2009 | Hopper et al. |
| 2009/0179723 A1 | 7/2009 | Ikriannikov et al. |
| 2009/0231081 A1 | 9/2009 | Ikriannikov et al. |
| 2009/0237197 A1 | 9/2009 | Ikriannikov et al. |
| 2011/0018669 A1 | 1/2011 | Ikriannikov |
| 2011/0032068 A1 | 2/2011 | Ikriannikov |
| 2011/0035607 A1 | 2/2011 | Ikriannikov |

OTHER PUBLICATIONS

Dong et al., The Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Papers received from Santangelo Law Office dated Dec. 22, 2006 and May 30, 2007, 263 pages.

Wong, Pit-Leong, et al., "Investigating Coupling Inductors in the Interleaving" Applied Power Electronics Conference and Exposition, 2000. APEC 2000. Fifteenth Annual IEEE; Mar. 2000; pp. 973-978.

Wong, Pit-Leong, et al.; A Novel Modeling Concept for Multi-coupling Core Structures; Center for Power Electronics Systems; IEEE.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

* cited by examiner

SWITCHING POWER CONVERTERS INCLUDING AIR CORE COUPLED INDUCTORS

BACKGROUND

Switching power converters using coupled inductors are known. For example, U.S. Pat. No. 6,362,986 to Schultz et al., which is incorporated herein by reference, discloses, among other things, multi-phase DC-to-DC converters including coupled inductors. These DC-to-DC converters typically have a higher effective switching frequency and lower switching ripple current magnitude than corresponding DC-to-DC converters using discrete (uncoupled) inductors.

FIG. 1 shows one prior art two-phase buck DC-to-DC converter 100 using a coupled inductor 102. Each phase 104 includes a switching device 106 electrically coupled between an input power source 108 and an inductor 110. A free wheeling device 112 is electrically coupled between inductor 110 and ground, in each phase 104. Each inductor 110 is electrically coupled to a common output node 114, which includes an output filter 116, such as a capacitor.

Each inductor 110 is part of common coupled inductor 102 shared among phases 104. In particular, each inductor 110 is magnetically coupled with each other inductor 110 via a magnetic core 118 of coupled inductor 102. Each inductor 110 has its own self inductance, often referred to as leakage inductance, which is critical to the operation of DC-to-DC converter 100. In particular, leakage inductance must be sufficiently large to prevent excessive switching ripple current magnitude. On the other hand, if leakage inductance is too large, DC-to-DC converter 100 will exhibit poor transient response. As taught in U.S. Pat. No. 6,362,986, magnetic coupling between inductors 110 in coupled inductor 102 should be sufficiently strong to realize the advantages associated with using a coupled inductor, instead of multiple discrete inductors, in DC-to-DC converter 100.

A controller 120 commands switching devices 106 to repeatedly switch between their conductive and non-conductive states to regulate the voltage magnitude on output node 114. Typically, controller 120 is configured so that switching devices 106 switch out of phase with respect to each other to promote cancellation of switching ripple current on output node 114. Free wheeling devices 112 provide a path for current through inductors 110 when switching devices 106 are in their non-conductive state.

The frequency at which controller 120 causes switching devices 106 to switch between their conductive and non-conductive states is referred to as the switching frequency of DC-to-DC converter 100. DC-to-DC converter 100 typically operates at a relatively high switching frequency, such as at least 100 kilohertz, to promote low ripple current magnitude, small size of coupled inductor 102, small size of output filter 116, and/or fast transient response of DC-to-DC converter 100. In particular, ripple current magnitude decreases as switching frequency increases, so ripple current magnitude can be decreased by increasing switching frequency. Low ripple current magnitude is typically desired because ripple current creates losses in components of DC-to-DC converter 100 and ripple voltage on output node 114.

Additionally, as discussed above, leakage inductance of inductors 110 must be sufficiently large so that ripple current magnitude is not excessively large. However, since ripple current magnitude decreases as switching frequency is increased, increasing switching frequency may allow leakage inductance of inductors 110 to be decreased while still maintaining an acceptable maximum ripple current magnitude. Decreasing leakage inductance advantageously improves DC-to-DC converter 100's transient response, and may allow coupled inductor 100 to be made smaller and/or cheaper. Furthermore, increasing switching frequency may allow size and/or cost of output filter 116 to be decreased.

Accordingly, there are significant advantages to operating a switching power converter using a coupled inductor at a high switching frequency. However, practical limitations typically prevent operating a switching power converter at as high of a switching frequency as desired. For example, core losses, which are losses in magnetic core 118 of coupled inductor 102 resulting from change in magnetic flux in core 118, typically increase with increasing switching frequency. Core losses are undesirable because they reduce efficiency of DC-to-DC converter 100 and may cause excessive heating of DC-to-DC converter 100. Thus, core losses in magnetic core 118 may prevent a switching power converter from being operated at as high of a switching frequency as desired.

SUMMARY

In an embodiment, a switching power converter includes a first and second switching device, an air core coupled inductor, and a controller. The air core coupled inductor includes a first winding electrically coupled to the first switching device and a second winding electrically coupled to the second switching device. The first and second windings are magnetically coupled. The controller is operable to cause the first and second switching devices to repeatedly switch between their conductive and non-conductive states at a frequency of at least 100 kilohertz to cause current through the first and second windings to repeatedly cycle, thereby providing power to an output port.

In an embodiment, a switching power converter includes a switching device, a free wheeling device, an air core coupled inductor, and a controller. The air core coupled inductor includes a first winding electrically coupled to the switching device and a second winding electrically coupled to the free wheeling device. The first and second windings are magnetically coupled. The controller is operable to cause the first and second switching devices to repeatedly switch between their conductive and non-conductive states at a frequency of at least 100 kilohertz to cause current through the first and second windings to repeatedly cycle, thereby providing power to an output port.

In an embodiment, a method for transferring power from an input power port to an output port in a switching power converter includes repeatedly switching first and second switching devices out of phase between their conductive and non-conductive states at a frequency of at least 100 kilohertz to cause current flowing through first and second windings of an air core coupled inductor to repeatedly cycle, thereby transferring power from the input power port to the output port.

In an embodiment, an air core coupled inductor includes a printed circuit board and first and second printed circuit board traces respectively forming at least partially overlapping first and second loops in the printed circuit board.

In an embodiment, an air core coupled inductor includes first and second wires at least partially twisted together and collectively forming a loop. The first and second wires form at least one offset cross sectional area where the first and second wires are not twisted together, and the at least one offset cross sectional area is disposed between portions of the first and second wires that are twisted together.

In an embodiment, an air core coupled inductor includes a printed circuit board and first and second staple style windings magnetically coupled and affixed to the printed circuit board.

DETAILED DESCRIPTION

As discussed above, switching frequency of a conventional switching power converter using a coupled inductor may be limited, at least in part, due to core losses in the magnetic core of the coupled inductor. However, as discussed below, the present inventor has invented systems and methods which can, among other things, help overcome this limitation. In this disclosure, specific instances of an item may be referred to by use of a numeral in parentheses (e.g., winding 202(1)) while numerals without parentheses refer to any such item (e.g., windings 202).

Figure 1:
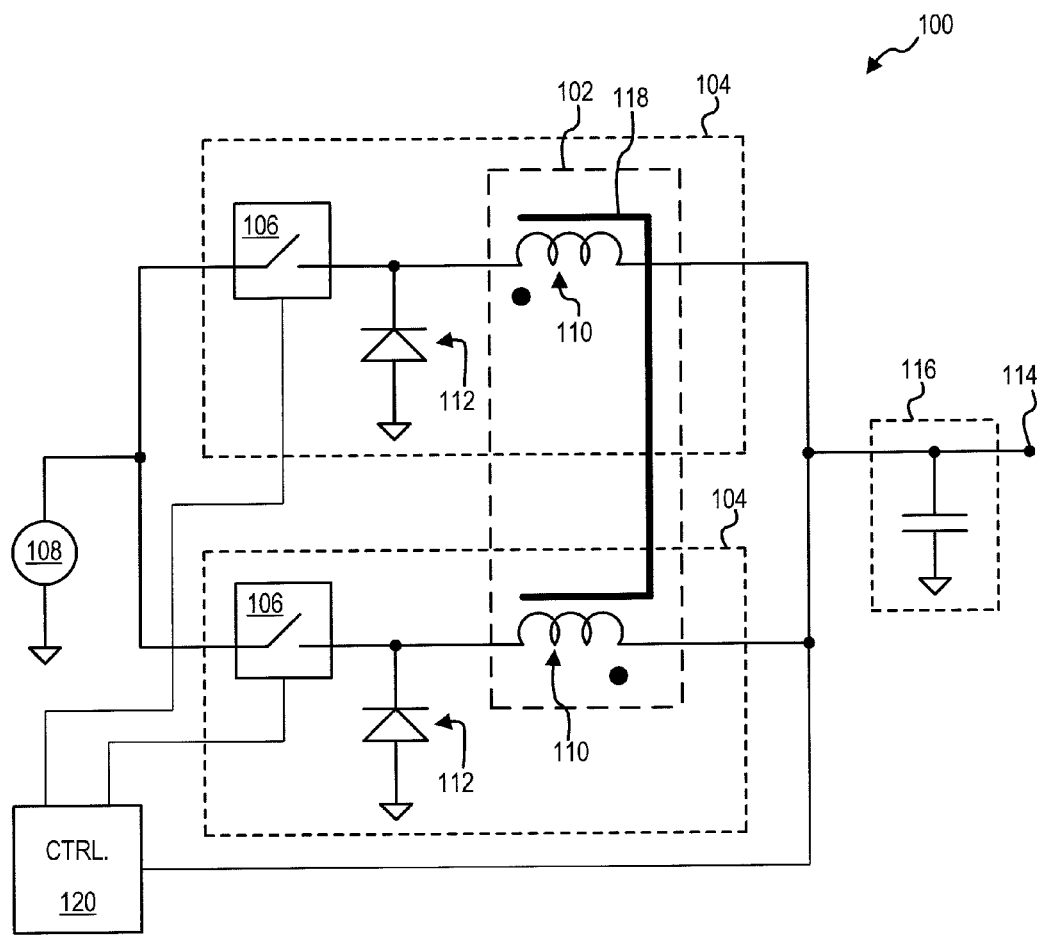
FIG. 1 shows one prior art DC-to-DC converter using a coupled inductor.
Figure 2:
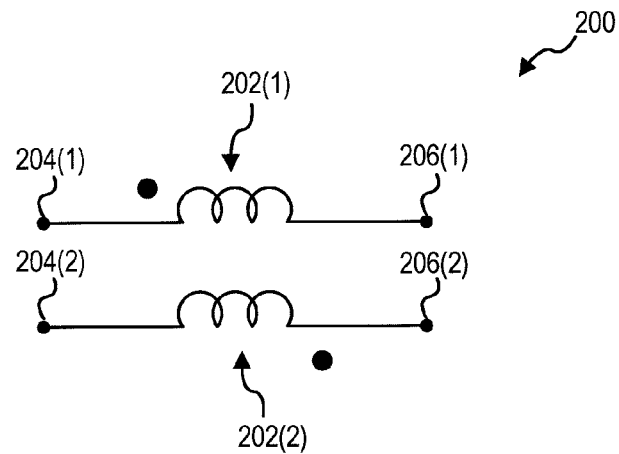
FIG. 2 is a schematic of one air core coupled inductor, according to an embodiment.

In particular, the present inventor has determined that switching frequency of a switching power converter using a coupled inductor can be increased by replacing the conventional coupled inductor (e.g., coupled inductor 102 of FIG. 1) with an air core coupled inductor. An air core coupled inductor differs from a conventional coupled inductor at least in that windings in an air core coupled inductor are magnetically coupled together without use of a magnetic core. For example, FIG. 2 is a schematic of an air core coupled inductor 200, including two or more windings 202, each having a respective first end 204 and a respective second end 206. Each winding 202 has a respective self inductance, or leakage inductance. Additionally, windings 202 are placed sufficiently close together so that they are magnetically coupled together without use of a magnetic core. Thus, current entering winding 202(1) from first end 204(1) induces current in winding 202(2) flowing out of second end 206(2), without use of a magnetic core. Similarly, current entering winding 202(2) from first end 204(2) induces current flowing in winding 202(1) out of second end 206(1), without use of a magnetic core. Accordingly, air core coupled inductor 200 advantageously does not exhibit core losses associated with a conventional coupled inductor, potentially enabling coupled inductor 200 to operate at higher switching frequencies than a conventional coupled inductor.

It is anticipated that air core coupled inductor 200 typically will not include a magnetic core. However, some embodiments of inductor 200 may nevertheless include one or more cores having minimal effect on magnetic coupling between windings 202, such as one or more cores to increase winding leakage inductance values. In such embodiments, the windings are substantially magnetically coupled together without use of the one or more magnetic cores, meaning that no more than 10% of a magnetic field flux magnetically coupling together the windings flows through the one or more magnetic cores. Non-magnetic materials other than air (e.g., cardboard, plastic, printed circuit board material, and/or adhesive) may separate windings in air core coupled inductor 200.

Use of an air core coupled inductor, instead of a conventional coupled inductor, in a switching power converter advantageously eliminates coupled inductor core losses associated with a conventional coupled inductor. Thus, use of an air core coupled inductor, instead of a conventional coupled inductor, may advantageously enable switching frequency to be increased, since core losses cannot occur when no core is present. Increasing switching frequency, in turn, may advantageously reduce ripple current magnitude, improve power converter transient response, and/or reduce size of filter components. Additionally, an air core coupled inductor may be simpler and/or cheaper to manufacture than a conventional coupled inductor because the air core coupled inductor does not include a core which contributes to inductor manufacturing complexity and cost. Accordingly, use of an air core coupled inductor, instead of a conventional coupled inductor, in a switching power converter may advantageously improve the converter's performance, reduce the converter's size, and/or reduce the converter's cost.

Figure 3:
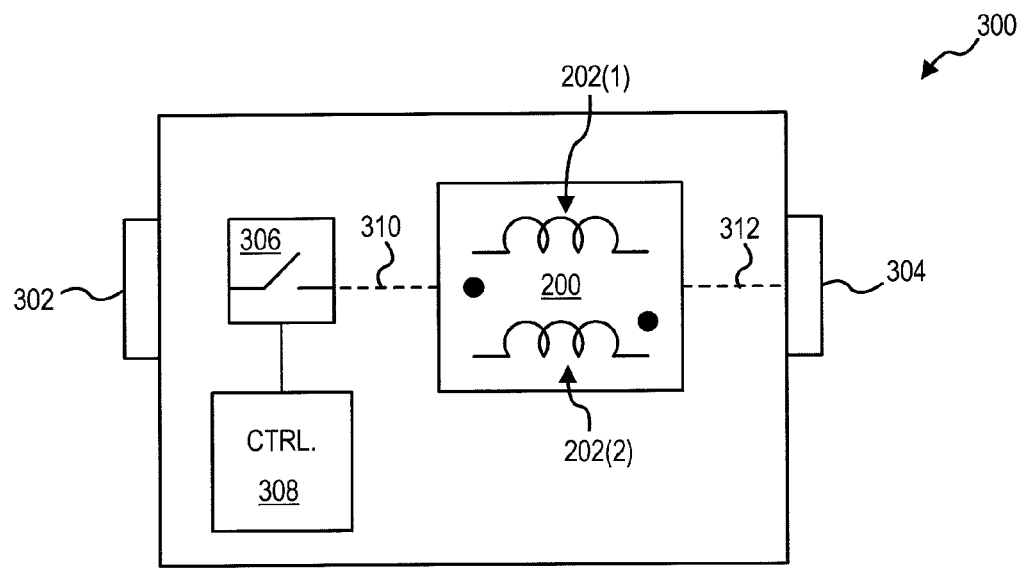
FIG. 3 shows one switching power converter using the air core coupled inductor of FIG. 2, according to an embodiment.

For example, FIG. 3 shows a block diagram of a switching power converter 300 using air core coupled inductor 200. Switching power converter 300 includes an input power port 302 and an output power port 304. A switching device 306 is electrically coupled to at least one winding 202 of air core coupled inductor 200, according to the topology of power converter 300, as indicated by dashed line 310. At least one winding 202 is electrically coupled to output power port 304, according to the topology of switching power converter 300, as indicated by dashed line 312. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

A controller 308 causes switching device 306 to periodically switch between its conductive and non-conductive states to cause current through first and second windings 202, 204 to repeatedly cycle, thereby providing power to output power port 304. Controller 308 is optionally configured to also control switching of switching devices 306 to regulate a characteristic of output power port 304, such as voltage of output power port 304 and/or current delivered to a load from output power port 304. Examples of topologies of switching power converter 300 include a multi-phase buck converter, a multi-phase boost converter, and a multi-phase buck-boost converter, using an air core coupled inductor. Switching power converter 300 could also be a single phase power converter of other architecture, such as a Ćuk converter using an air core coupled inductor. Examples of each of these topologies are discussed below. However, switching power converter 300 is not limited to these topologies, and could instead have a different topology using an air core coupled inductor.

Figure 4:
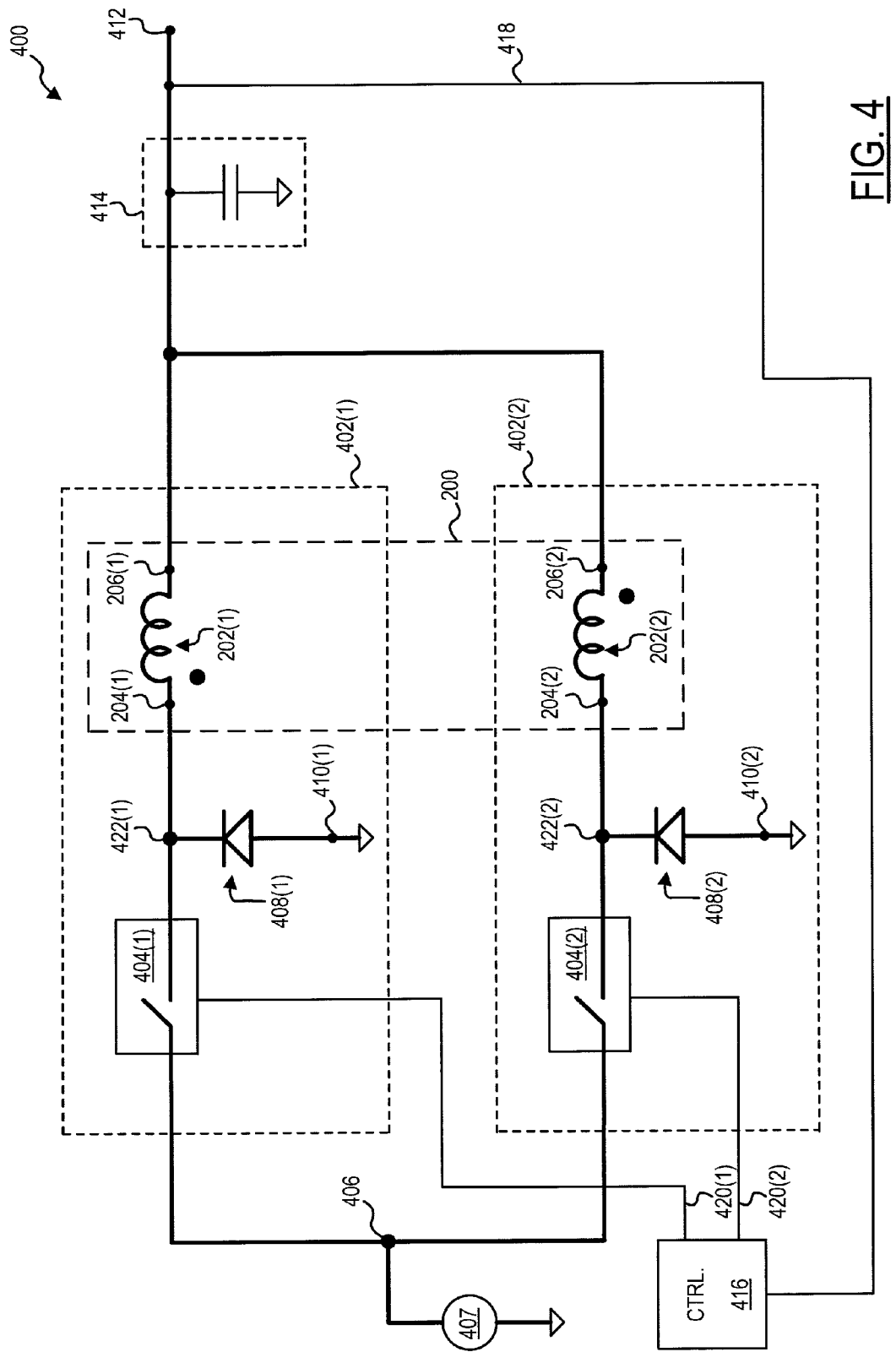
FIG. 4 shows one multi-phase buck converter using the air core coupled inductor of FIG. 2, according to an embodiment.

In an exemplary embodiment, FIG. 4 shows one multi-phase buck converter 400 using air core coupled inductor 200. Each phase 402 includes a switching device 404 electrically coupled between an input power port 406 and first end 204 of a respective winding 202 of coupled inductor 200. Input power port 406 is electrically coupled to an input power source 407. A free wheeling device 408 is electrically coupled between first end 204 of winding 202 and a reference node 410 (e.g., ground), in each phase 402. Each second end 206 of each winding 202 is electrically coupled to a common output node or port 412. A filter 414, which for example includes a capacitor, is electrically coupled to output port 412 and filters ripple current generated by switching devices 404.

A controller 416 controls operation of buck converter 400. Controller 416 controls switching devices 404 via control lines 420. Controller 416 causes switching devices 404 to repeatedly switch between their conductive and non-conductive states to cause current through first and second windings 202(1), 202(2) to repeatedly cycle, thereby providing power to output port 412. Controller 416 also optionally monitors output port 412 via a feedback line 418 and controls switching of switching devices 404 to regulate voltage on output port 412 and/or current provided from output port 412 to a load. Controller 416 typically operates buck converter 400 at a switching frequency of at least 100 kilohertz to reduce magnitude of ripple current, to minimize size of filter components, and/or to provide fast transient response. As discussed above, the fact that buck converter 400 uses an air core coupled inductor, instead of a conventional coupled inductor, may enable buck converter 400 to operate at a higher switching frequency than conventional multi-phase buck converters using a coupled inductor. In certain embodiments, controller 416 is operable to control switching devices 404 according to a pulse width modulation (PWM) and/or a pulse frequency modulation (PFM) control scheme. Controller 416 is typically configured so that switching devices 404 switch out of phase (e.g., 180 degrees out of phase) with respect to each other to help cancel ripple current at output port 412.

Free wheeling devices 408 provide a path for current flowing through windings 202 after switching devices 404 have turned off. In a particular embodiment, free wheeling devices 408 are diodes (e.g., schottky diodes) as shown in FIG. 4. In an alternative embodiment, free wheeling devices 408 are switching devices with appropriate control circuitry (e.g., switching devices operating under the command of controller 416). Use of switching devices, instead of diodes, as free wheeling devices 408 may advantageously reduce forward voltage drop across free wheeling devices 408, since properly selected switching devices typically exhibit a lower forward voltage drop than even schottky diodes. It may also be desirable to use switching devices, instead of diodes, as free wheeling devices 408 to enable continuous conduction mode operation at light load and/or enable buck converter 400 to sink current.

Figure 5:
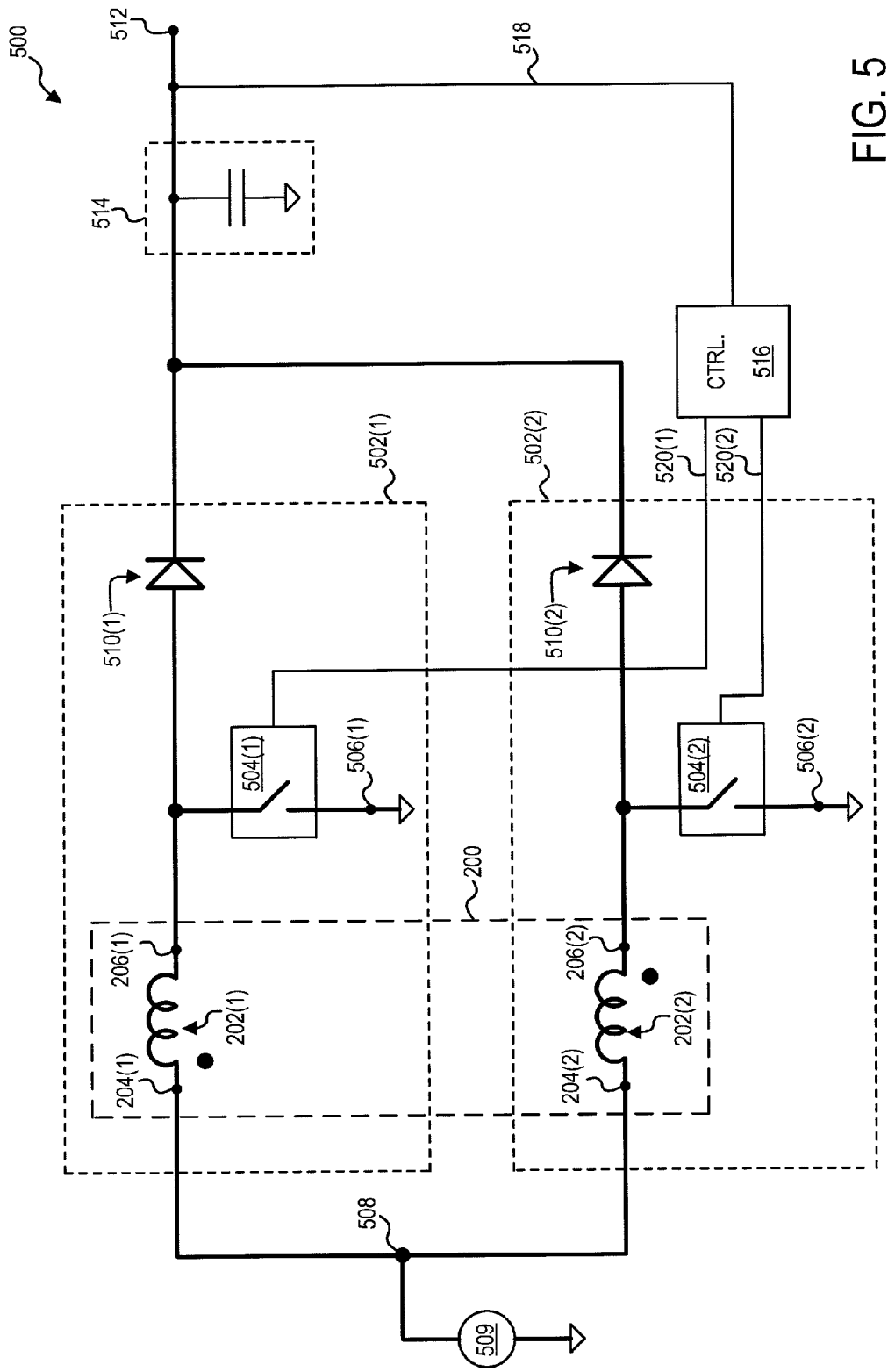
FIG. 5 shows one multi-phase boost converter using the air core coupled inductor of FIG. 2, according to an embodiment.

FIG. 5 shows a multi-phase boost converter 500 using air core coupled inductor 200. Each phase 502 includes a switching device 504 electrically coupled between a second end 206 of a respective winding 202 and a reference node 506 (e.g., ground). A first end 204 of each winding 202 is electrically coupled to an input power port 508, which is in turn electrically coupled to an input power source 509. Each phase 502 further includes a respective free wheeling device 510 electrically coupled between second end 206 of winding 202 and a common output node or port 512. A filter 514, which typically includes a capacitor, is also electrically coupled to output port 512 to filter ripple current generated by switching of switching devices 504.

A controller 516 commands switching devices 504 to repeatedly switch between their conductive and non conductive states to cause current through first and second windings 202(1), 202(2) to repeatedly cycle, thereby providing power to output port 512. Controller 516 also optionally monitors output port 512 via a feedback line 518 and controls switching of switching devices 504 to regulate a characteristic of output port 512 (e.g., voltage at output port 512 and/or current delivered to a load from output port 512). Controller 516 interfaces with switching devices 504 via control lines 520. Controller 516 typically operates boost converter 500 at a switching frequency of at least 100 kilohertz to prevent excessive ripple current magnitude, to allow use of small filter components (e.g., filter 514), and/or to promote fast transient response. In some embodiments, controller 516 switches switching devices 504 between their conductive and non-conductive states according to a PWM and/or a PFM scheme. Controller 516 typically switches switching devices 504 out of phase (e.g., 180 degrees out of phase) with respect to each other. The fact that boost converter 500 includes an air core coupled inductor, instead of a conventional coupled inductor, may allow boost converter 500 to operate at a higher switching frequency than conventional boost converters using coupled inductors.

Free wheeling devices 510 provide a path for current flowing through windings 202 after switching devices 504 have shut off. In a particular embodiment, free wheeling devices 510 are diodes, as shown in FIG. 5. In an alternative embodiment, free wheeling devices 510 are switching devices with appropriate control circuitry (e.g., switching devices operating under the command of controller 516), such as to reduce forward voltage drop, enable continuous conduction mode operation at light load, and/or enable converter 500 to sink current.

Figure 6:
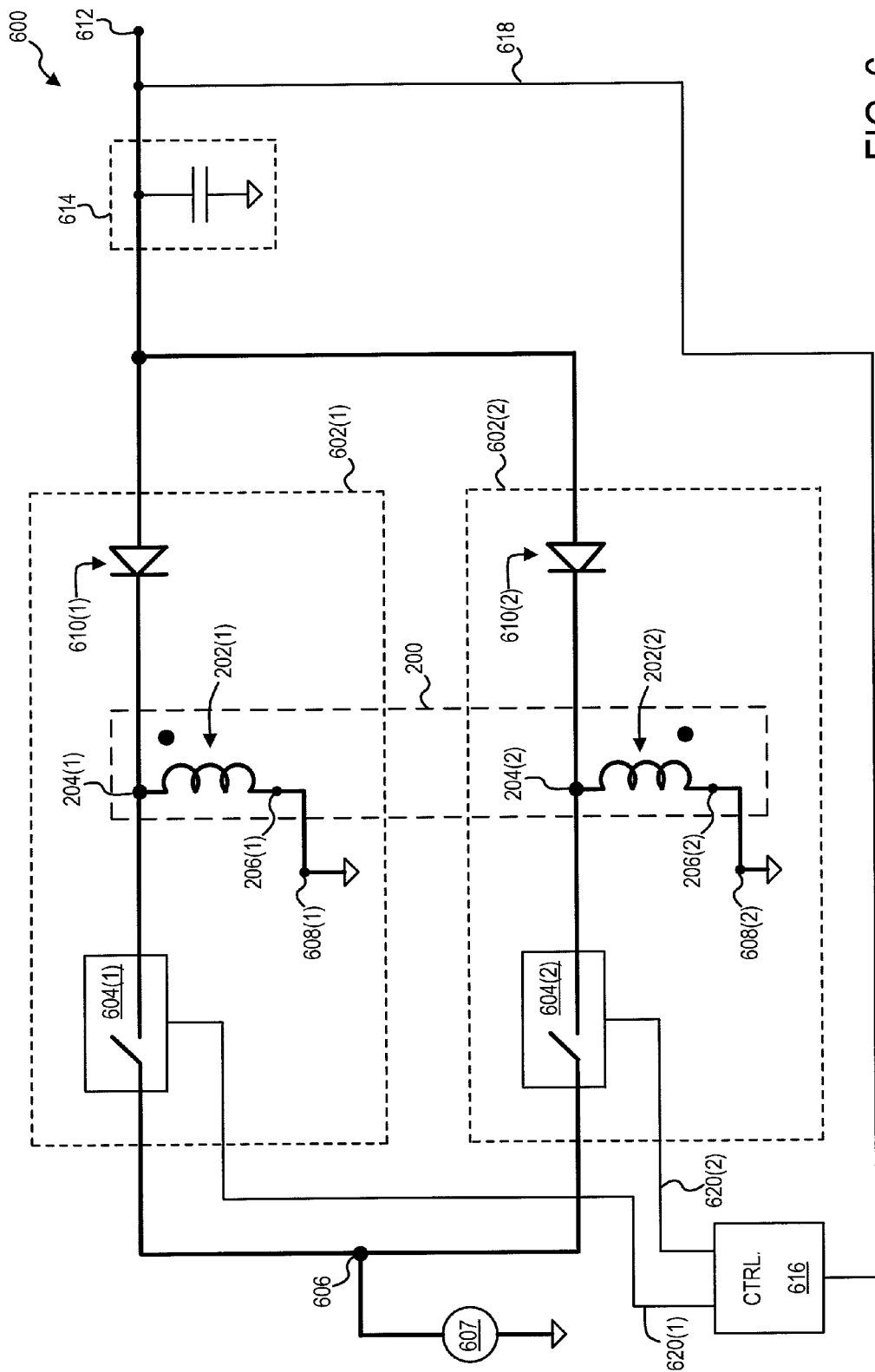
FIG. 6 shows one multi-phase buck-boost converter using the air core coupled inductor of FIG. 2, according to an embodiment.

FIG. 6 shows a multi-phase buck-boost converter 600 using air core coupled inductor 200. Each phase 602 includes a switching device 604 electrically coupled between an input power port 606 and a first end 204 of a respective winding 202 of coupled inductor 200. Input power port 606 is electrically coupled to an input power source 607. A second end 206 of each winding 202 is electrically coupled to a reference node 608 (e.g., ground). Each phase 602 further includes a free wheeling device 610 electrically coupled between first end 204 of winding 202 and a common output node or port 612. A filter 614, which typically includes a capacitor, is also electrically coupled to output port 612 to filter ripple current generated by switching of switching devices 604.

A controller 616 commands switching devices 604 to repeatedly switch between their conductive and non-conductive states to cause current through first and second windings 202(1), 202(2) to repeatedly cycle, thereby providing power to output power 612. Controller 616 also optionally monitors output port 612 via a feedback line 618 and controls switching of switching devices 604 to regulate a characteristic of output port 612 (e.g., output voltage on output port 612 and/or current delivered to a load from output port 612). Controller 616 interfaces with switching devices 604 via control lines 620. Controller 616 typically operates buck-boost converter 600 at a switching frequency of at least 100 kilohertz to prevent excessive ripple current magnitude. The fact that buck-boost converter 600 has an air core coupled inductor, instead of a conventional coupled inductor, may advantageously allow buck-boost converter 600 to operate at higher switching frequencies than conventional buck-boost converters using coupled inductors. Controller 616 typically is configured to switch each switching device 604 out of phase (e.g., 180 degrees out of phase) with respect to each other switching device. In certain embodiments, controller 616 switches switching devices 604 according to a PWM and/or a PFM scheme.

Free wheeling devices 610 provide a path for current flowing through windings 202 after switching devices 604 turn off. In a particular embodiment, free wheeling devices 610 are diodes, as shown in FIG. 6. In an alternative embodiment, free wheeling devices 610 are switching devices with appropriate control circuitry (e.g., switching devices operating under the command of controller 616), such as to reduce forward voltage drop, enable continuous conduction mode operation at light load, and/or enable converter 600 to sink current.

Figure 7:
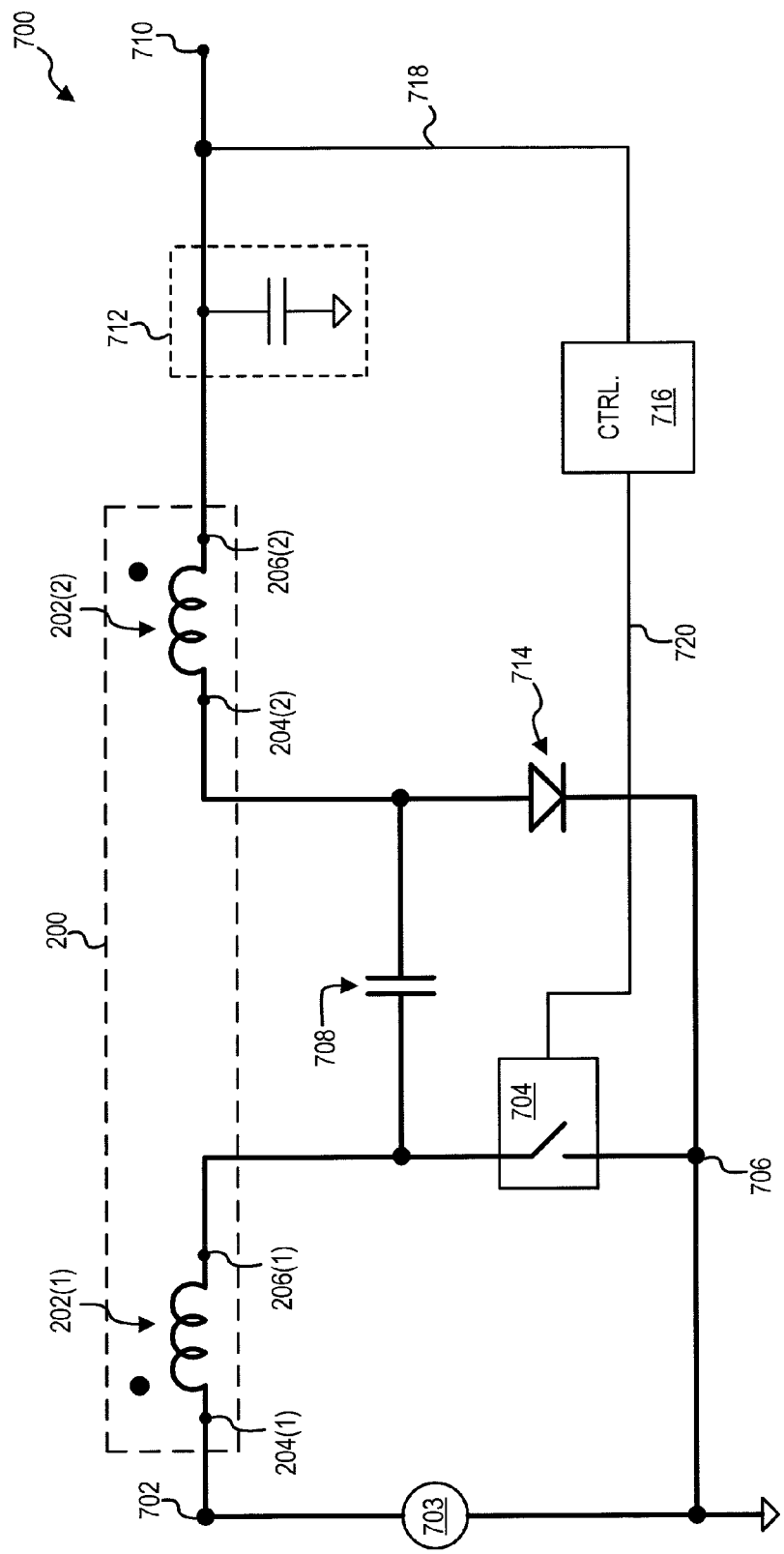
FIG. 7 shows one Ćuk converter using the air core coupled inductor of FIG. 2, according to an embodiment.

As discussed above, an air core coupled inductor may also be used in a single phase switching power converter. FIG. 7 shows a Ćuk converter 700 using air core coupled inductor 200. A first end 204(1) of winding 202(1) of coupled inductor 200 is electrically coupled to an input power port 702, and a second end 206(1) of winding 202(1) is electrically coupled to a switching device 704. Input power port 702 is electrically coupled to an input power source 703. Switching device 704 is electrically coupled between second end 206(1) and a reference node 706 (e.g., ground). A capacitor 708 is electrically coupled between second end 206(1) of winding 202(1) and a first end 204(2) of winding 202(2). A second end 206(2) of winding 202(2) is electrically coupled to an output node or port 710. A filter 712 is also electrically coupled to output port 710 to filter ripple current generated by switching of switching device 704. A free wheeling device 714 is electrically coupled between first end 204(2) of winding 202(2) and reference node 706. Free wheeling device 714 provides a path for current flowing through winding 202(2) when switching device 704 turns off.

A controller 716 causes switching device 704 to repeatedly switch between its conductive and non-conductive states to cause current through first and second windings 202(1), 202(2) to repeatedly cycle, thereby providing power to output port 710. Controller 716 also optionally monitors output port 710 via a feedback line 718 and controls switching of switching device 704 to regulate a characteristic of output port 710 (e.g., voltage on output port 710 and/or current flowing from output port 710 to a load), typically at a switching frequency of at least 100 kilohertz to prevent excessive ripple current magnitude. Controller 716 interfaces with switching device 704 via a control line 720. In certain embodiments, controller 716 switches switching device 704 between its conductive and non-conductive states according to a PWM and/or a PFM scheme. In a particular embodiment, free wheeling device 714 is a diode, as shown in FIG. 7. In an alternative embodiment, free wheeling device 714 is a switching device with appropriate control circuitry (e.g., a switching device operating under the command of controller 716), such as to reduce forward voltage drop across free wheeling device 714.

Discussed below are a number of examples of how the air core coupled inductors disclosed herein can be configured. For example, air core coupled inductor 200 could take the form of air core coupled inductor 800, 900, 1000, 1100, 1200, 1300, 1400, 1500, 1600, 1700, 2000, 2100, 2200, 2300, 2600, or 2700, discussed below. However, it should be appreciated that the air core coupled inductors of this disclosure can be configured in other manners and are therefore not limited to these examples.

Figure 8:
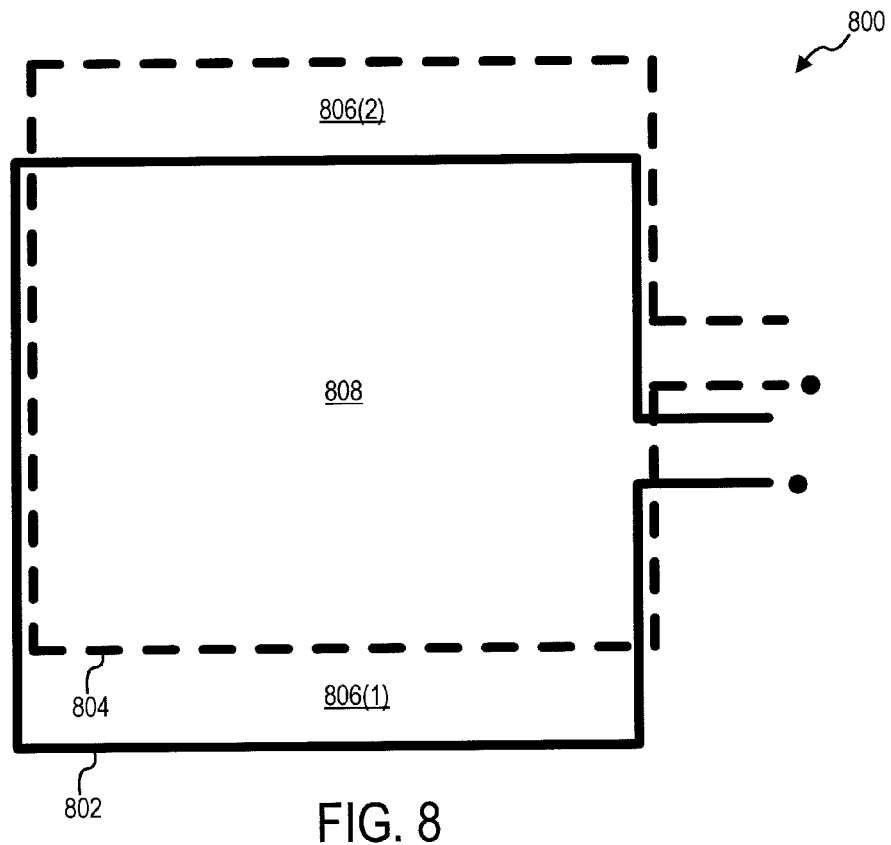
FIG. 8 shows one air core coupled inductor including two windings, according to an embodiment.

FIG. 8 shows one air core coupled inductor 800 including two windings 802, 804 forming respective loops. Winding 804 is shown as a dashed line in FIG. 8 to distinguish it from winding 802. Windings 802, 804 are, for example, formed conductive wire, foil, or bars. In some embodiments, windings 802, 804 are conductive circuit traces of a printed circuit board (PCB).

The loops of windings 802, 804 typically do not completely overlap, as shown in FIG. 8, to increase leakage inductance values of windings 802, 804, since leakage inductance must be sufficiently large to prevent excessive ripple current magnitude. In particular, coupled inductor 800 typically includes one or more offset cross sectional areas 806, where magnetic field flux generated by one of windings 802, 804 is not substantially magnetically coupled to the other of windings 802, 804. Thus, leakage inductance can be varied by varying the configuration of offset cross sectional areas 806. For example, leakage inductance can be increased by increasing the size of offset cross sectional areas 806.

It is anticipated that in many embodiments, offset cross sectional areas 806(1), 806(2) will have a similar size and shape so that the respective leakage inductance values associated with windings 802, 804 are approximately equal. However, asymmetrical leakage inductance values may be desired in certain applications, and offset cross sectional areas 806(1), 806(2) may have different sizes and/or shapes so that the respective leakage inductance values associated with windings 802, 804 are different. For example, if offset cross sectional area 806(2) is made significantly larger than offset cross sectional area 806(1), leakage inductance associated with winding 804 will be larger than that associated with winding 802, since offset cross sectional area 806(2) primarily contributes to leakage inductance associated with winding 804, and offset cross sectional area 806(1) primarily contributes to leakage inductance associated with winding 802.

Air core coupled inductor 800 also includes common cross sectional area 808, where magnetic field flux generated by one of windings 802, 804 is substantially magnetically coupled to the other of windings 802, 804. Accordingly, magnetizing inductance can be varied by varying the configuration of common cross sectional area 808. For example, magnetizing inductance can be increased by increasing the size of common cross sectional area 808.

It is anticipated that alternate embodiments of air core coupled inductor 800 will have different winding shapes (e.g., circular, oval, trapezoidal, etc.). The number of common and/or offset cross sectional areas 806, 808 could also be varied. For example, an additional offset cross sectional area could be added to increase leakage inductance of windings 802, 804.

Figure 9:
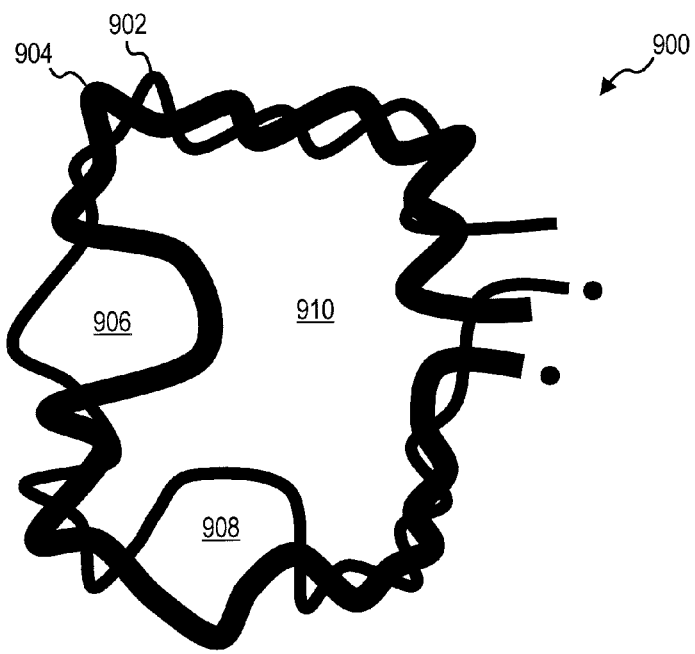
FIG. 9 shows one air core coupled inductor including two wire windings twisted together, according to an embodiment.

FIG. 9 shows an air core coupled inductor 900 including two conductive wire windings 902, 904 at least partially twisted or wound together to establish magnetic coupling between wires 902, 904. Wire 902 is shown in FIG. 9 as being thinner than wire 904 to distinguish wires 902, 904 in the figure. However, it is anticipated that most embodiments of coupled inductor 900 will have wires 902, 904 of the same thickness (i.e., of the same wire gauge). Wires 902, 904 collectively form a loop, as shown in FIG. 9.

Air core coupled inductor 900 may be particularly useful in applications where components are physically separated from each other, but need to be electrically coupled together. In such applications, air coupled inductor 900 could serve dual roles as (1) an electrical connector electrically coupling together the physically separated components, and (2) a coupled inductor, thereby promoting low cost and space savings by achieving two functions with a single component.

Wires 902, 904 are typically not completely twisted together to increase leakage inductance values associated with windings 902, 904. For example, FIG. 9 shows wires 902, 904 including two offset cross sectional areas 906, 908 where wires 902, 904 are not twisted together and are spaced apart. Offset cross sectional areas 906, 908 are disposed between portions of wires 902, 904 that are twisted together. Offset cross sectional area 906 primarily boosts leakage inductance associated with wire 902, and offset cross sectional area 908 primarily boosts leakage inductance associated with wire 904. Similar to coupled inductor 800 (FIG. 8), offset cross sectional areas 906, 908 may have a similar size and shape so that the respective leakage inductance values associated with wires 902, 904 are approximately equal. Alternately, offset cross sectional areas 906, 908 may have different sizes and/or shapes so that the respective leakage inductance values associated with wires 902, 904 are different.

It should be appreciated that the number and/or configuration of offset cross sectional areas may be varied to adjust leakage inductance values associated with wires 902, 904. For example, leakage inductance can be increased by adding additional offset cross sectional areas.

Air core coupled inductor 900 also includes a common cross sectional area 910, where magnetic field flux generated by one of wires 902, 904 is substantially magnetically coupled to the other of wires 902, 904. Accordingly, magnetizing inductance can be varied by varying the configuration of common cross sectional area 910. For example, magnetizing inductance can be increased by increasing the size of common cross sectional area 910.

Figure 10:
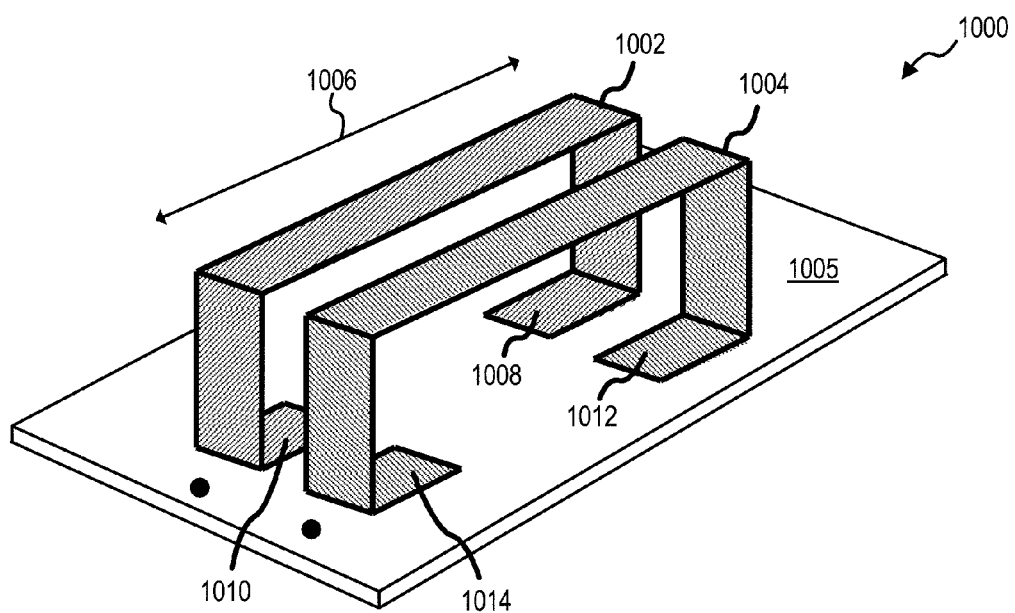
FIG. 10 shows a perspective view of one air core coupled inductor including two staple style windings, according to an embodiment.
Figure 11:
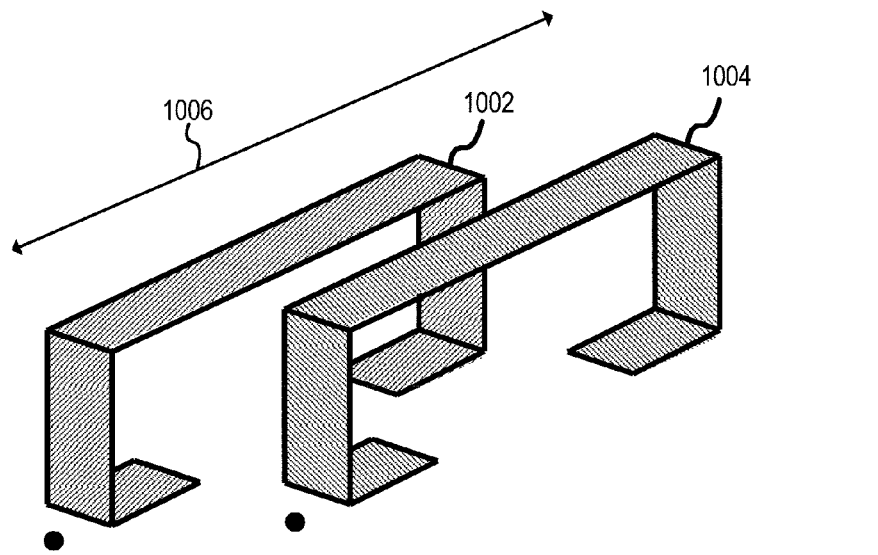
FIG. 11 shows a perspective view of an alternate embodiment of the air core coupled inductor of FIG. 10.

FIG. 10 shows an air core coupled inductor 1000 including two staple style windings 1002, 1004, which are optionally affixed to a PCB 1005. As shown in FIG. 10, windings 1002, 1004 are aligned along lengthwise axis 1006 of windings 1002, 1004. However the relative position of windings 1002, 1004 can be varied to vary leakage and magnetizing inductance values. For example, FIG. 11 shows an air core coupled inductor 1100, which is the similar to coupled inductor 1000 (FIG. 10), but with windings 1002, 1004 offset along axis 1006. Therefore, coupled inductor 1100 will have larger leakage inductance values and a smaller magnetizing inductance value than inductor 1000, since a smaller portion of windings 1002, 1004 are aligned along axis 1006 in inductor 1100 than in inductor 1000. It should also be noted that magnetizing inductance could be increased without significantly affecting leakage inductance by increasing the length of both windings 1002, 1004 along axis 1006. Each winding 1002, 1004 optionally forms a solder tab 1008, 1010, 1012, and 1014 at its ends, as shown in FIG. 10. Solder tabs 1008, 1010, 1012, and 1014 are each configured for surface mount attachment to a PCB.

Figure 12:
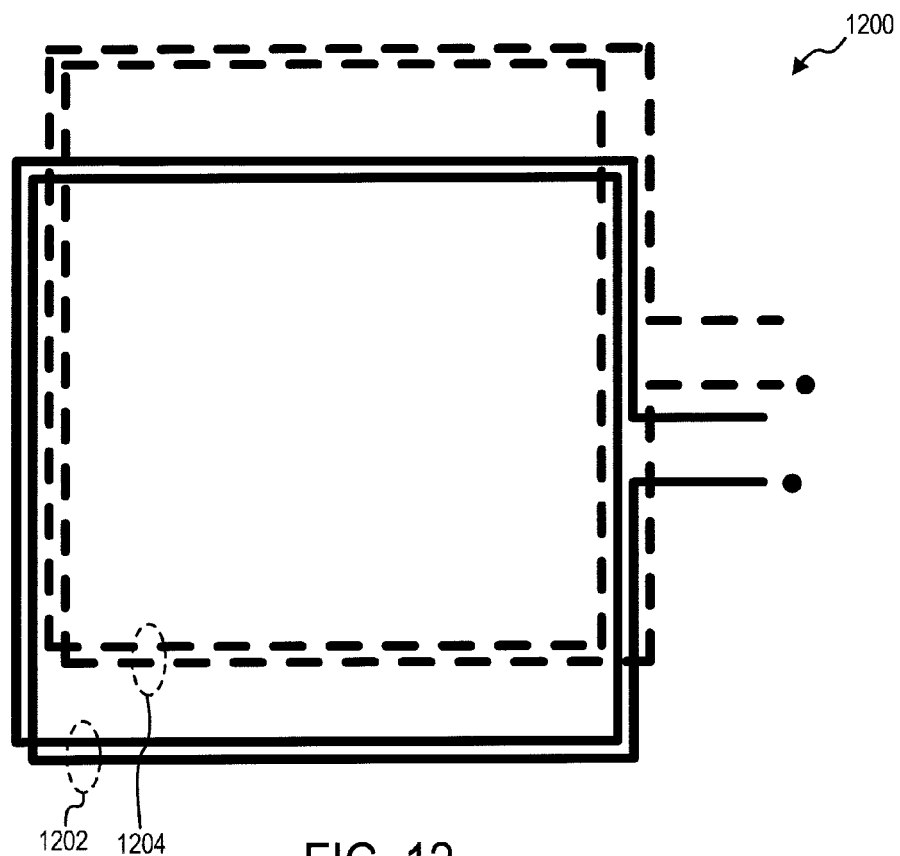
FIG. 12 shows an air core coupled inductor similar to the coupled inductor of FIG. 8, but where the windings form two turns, according to an embodiment.
Figure 13:
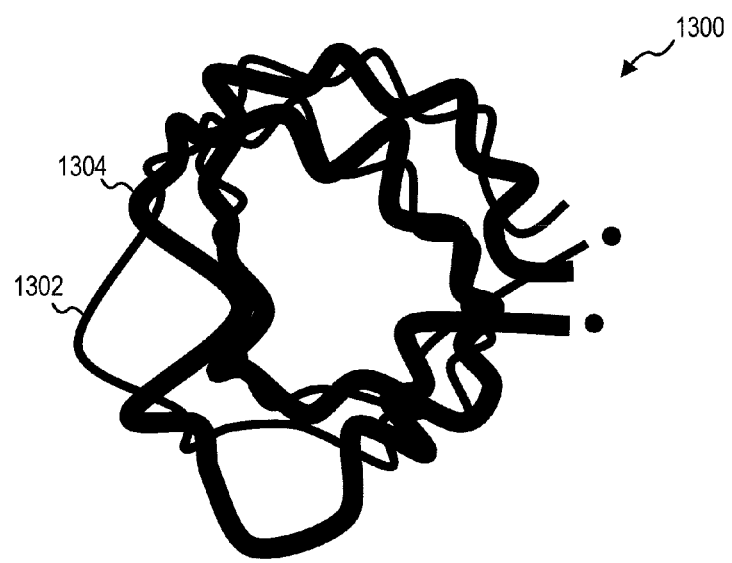
FIG. 13 shows an air core coupled inductor similar to the coupled inductor of FIG. 9, but where the windings form two turns, according to an embodiment.
Figure 14:
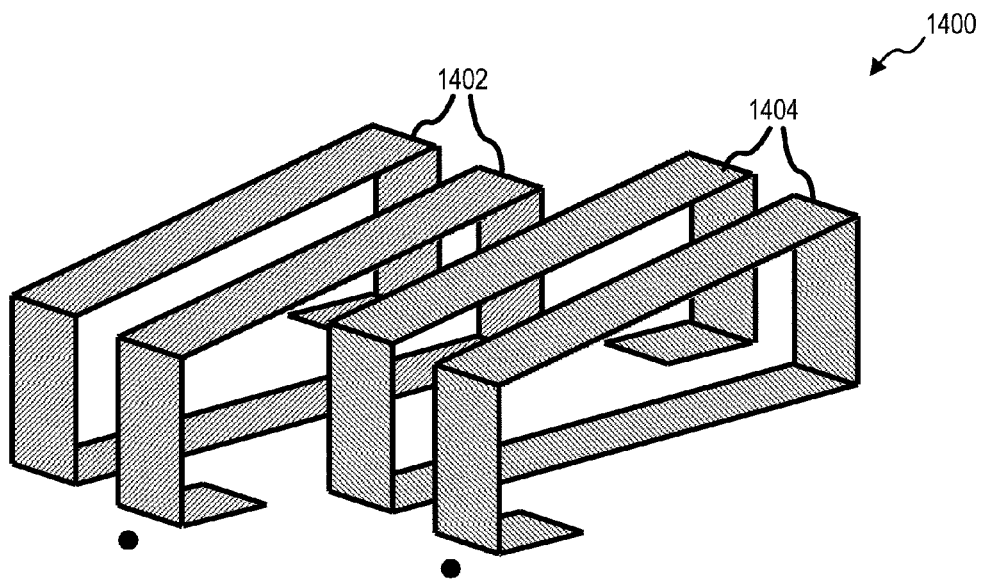
FIG. 14 shows a perspective view of an air core coupled inductor similar to the coupled inductor of FIG. 11, but where the windings form two turns, according to an embodiment.

It is anticipated that certain embodiments of the coupled inductors disclosed herein will have windings with more than one turn. Increasing the number of turns can be used to increase inductance values and/or decrease inductor size while maintaining acceptably high inductance values. For example, FIG. 12 shows a coupled inductor 1200, which is similar to coupled inductor 800 (FIG. 8), but with windings 1202, 1204 each forming two turns or loops. FIG. 13 shows a coupled inductor 1300, which is similar to coupled inductor 900 (FIG. 9), but with windings 1302, 1304 collectively forming two turns or loops. FIG. 14, in turn, shows a coupled inductor 1400, which is similar to coupled inductor 1100 (FIG. 11), but with windings 1402, 1404 each forming two turns.

Figure 15:
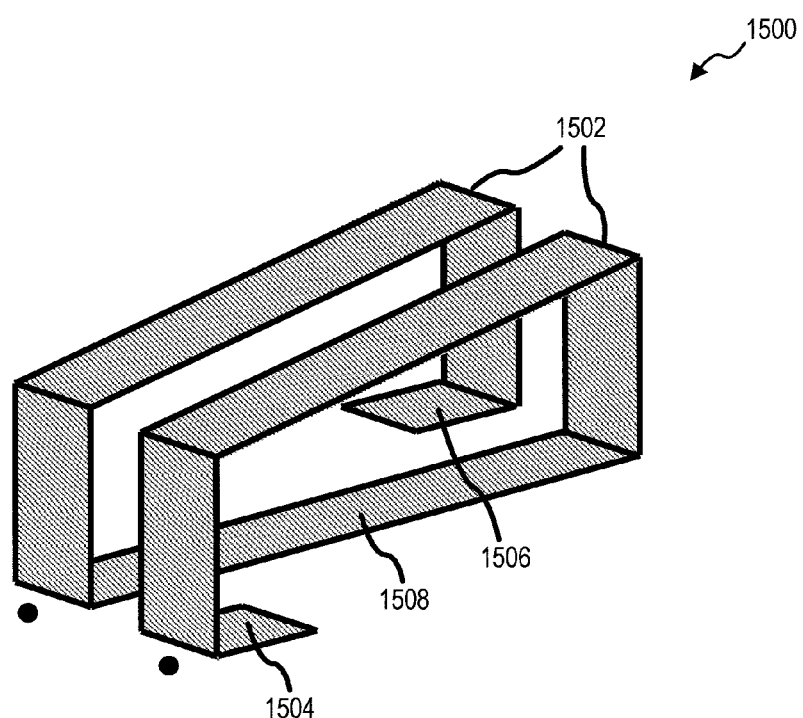
FIG. 15 shows a perspective view of one air core coupled inductor including a single staple style conductor, according to an embodiment.

Certain embodiments of the air core coupled inductors disclosed herein take the form of a single structure. For example, FIG. 15 shows an air core coupled inductor 1500 including a single staple style conductor 1502. Conductor 1500 can be configured as two separate windings magnetically coupled together without use of a magnetic core. For example, if coupled inductor 1500 were used in a multi-phase buck converter (e.g., buck converter 400 of FIG. 4), portion 1504 of conductor 1502 would typically be connected to a first switching node (e.g., switching node 422(1) of FIG. 4), portion 1506 would typically be connected to a second switching node (e.g., switching node 422(2) of FIG. 4), and common section or portion 1508 would typically be connected to a common output node (e.g., output port 412 of FIG. 4). Portions 1504, 1506, and 1508 optionally form solder tabs configured for surface mount soldering to a PCB, as shown in FIG. 15.

Figure 16:
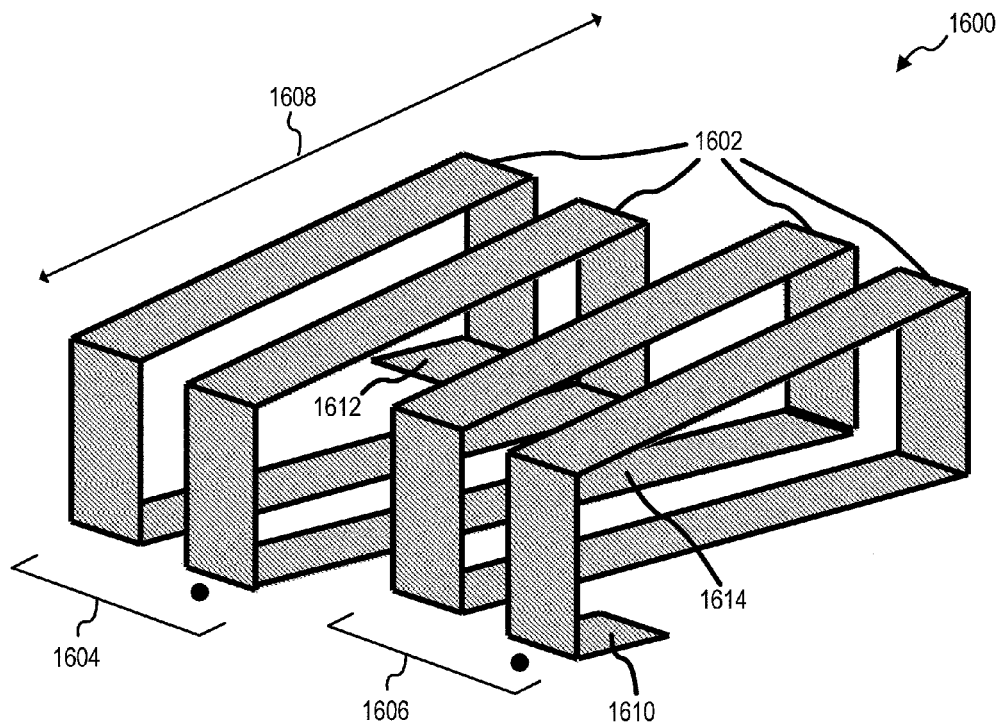
FIG. 16 shows an alternate embodiment of the air core coupled inductor of FIG. 15.

The alignment and/or length of sections of conductor 1502 can be varied to vary leakage and/or magnetizing inductance. For example, FIG. 16 shows an air core coupled inductor 1600, which is similar to coupled inductor 1500, but includes a single conductor 1602 that can be configured as an air core coupled inductor with windings having two turns. Section 1604 of conductor 1602 is offset relative to section 1606 of conductor 1602 along lengthwise axis 1608 of the windings to increase leakage inductance and to decrease magnetizing inductance. If coupled inductor 1600 were used in a multi-phase buck converter, portion 1610 of conductor 1602 would typically be connected to a first switching node (e.g., switching node 422(1) of FIG. 4), portion 1612 would typically be connected to a second switching node (e.g., switching node 422(2) of FIG. 4), and a common section or portion 1614 would typically be connected to a common output node (e.g., output port 412 of FIG. 4). Portions 1610, 1612, and 1614 optionally form solder tabs configured for surface mount soldering to a PCB, as shown in FIG. 16.

Figure 17:
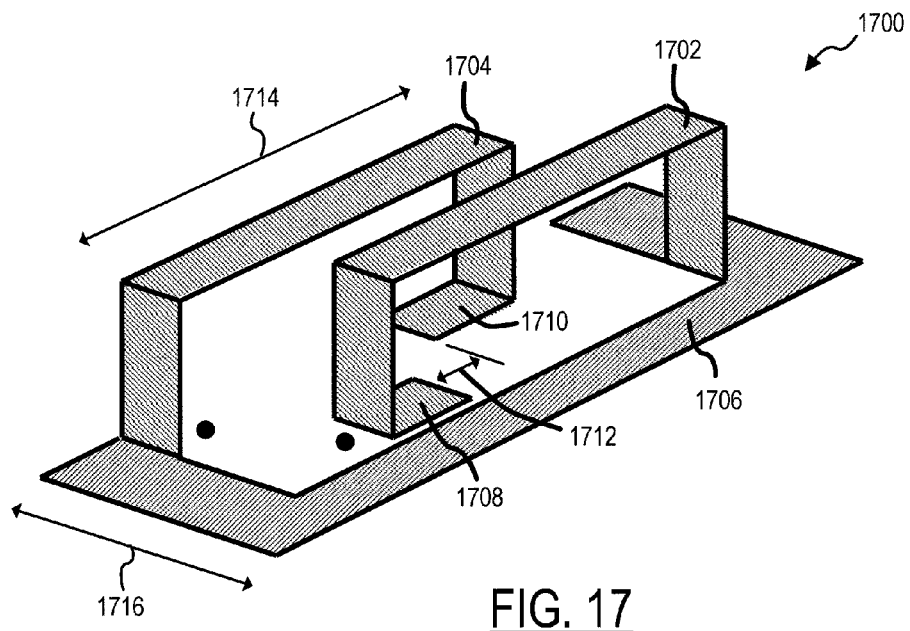
FIG. 17 shows a perspective view of another air core coupled inductor including two staple style windings, according to an embodiment.
Figure 18:
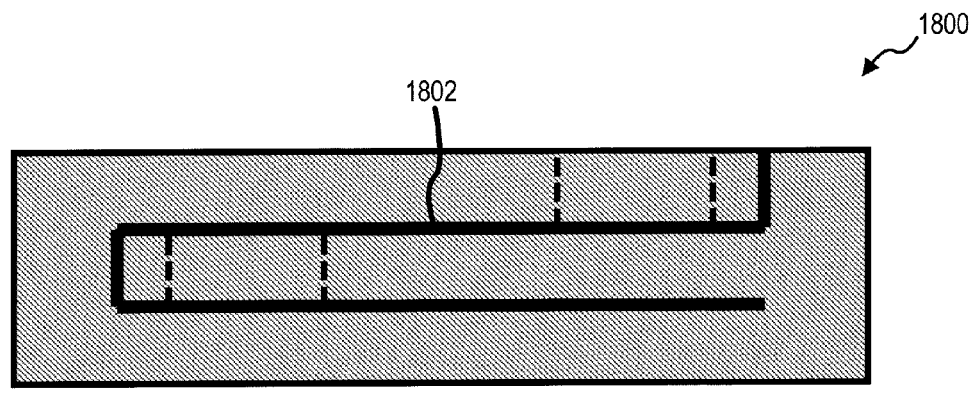
FIG. 18 shows a plan view of a strip of conductive foil prepared for bending into an embodiment of the coupled inductor of FIG. 17.

FIG. 17 shows another air core coupled inductor 1700 including two staple style windings 1702, 1704 connected via a conductive common section 1706. In certain embodiments, air core coupled inductor 1700 is a single structure (e.g., windings 1702, 1704 and common section 1706 are part of a single piece of conductive foil), thereby promoting ease of manufacturing and installation of coupled inductor 1700. For example, FIG. 18 shows a plan view of a strip 1800 of conductive foil prepared for bending into an embodiment of coupled inductor 1700. Solid line 1802 indicates where strip 1800 has been cut, and the dashed lines (not labeled) indicate where strip 1800 is to be bent. Strip 1800's rectangular shape promotes efficient resource utilization during manufacturing since commercially available conductive foil typically has a rectangular shape.

Returning to FIG. 17, a distal end of each winding 1702, 1704 forms a solder tab 1708, 1710 configured for surface mount attachment to a PCB. Conductive common section 1706 is configured for surface mount attachment to a PCB, and common section 1706 can therefore supplement or replace one or more PCB circuit traces. It is anticipated that a conductive foil forming coupled inductor 1700 will typically be significantly thicker than a PCB circuit trace. Thus, common section 1706 will typically have a significantly lower resistance than a similarly sized/shaped PCB circuit trace, since common section 1706 is typically significantly thicker than a PCB circuit trace. Therefore, use of common portion 1706 as a supplement to or a substitute for one or more PCB circuit trace may significantly lower system resistance. If coupled inductor 1700 were used in a multi-phase buck converter, solder tab 1708 would typically be connected to a first switching node (e.g., switching node 422(1) of FIG. 4), solder tab 1710 would typically be connected to a second switching node (e.g., switching node 422(2) of FIG. 4), and common section 1706 would typically be connected to a common output node (e.g., output port 412 of FIG. 4).

Figure 19:
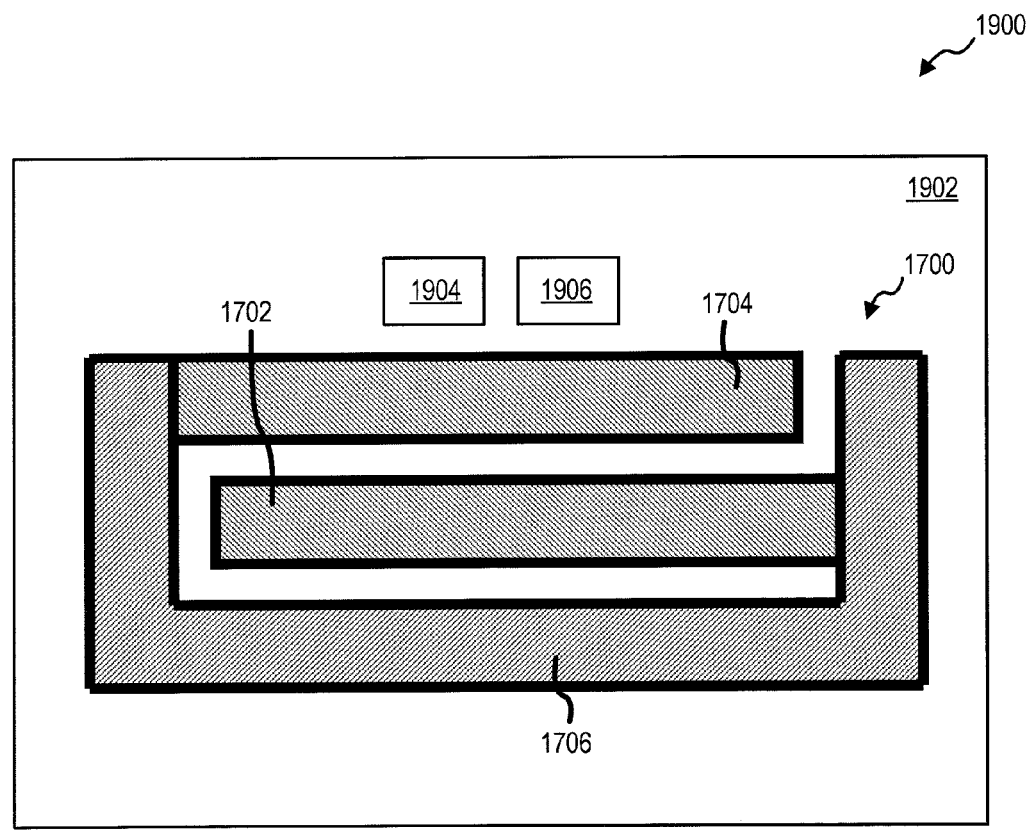
FIG. 19 shows a top plan view of a printed circuit assembly including an embodiment of the coupled inductor of FIG. 17.

In certain embodiments, a separation distance 1712 between solder tabs 1708, 1710 is relatively small, thereby potentially enabling switching stages to be located close together, since switching stages should be located near their respective winding ends to minimize interconnection losses and ringing. Placing switching stages close together may be desirable in certain applications, such as where multiple switching stages share a common heatsink. FIG. 19 shows a top plan view of a printed circuit assembly 1900, which is one possible two-phase buck converter application of coupled inductor 1700. Assembly 1900 includes a PCB 1902, switching stages 1904, 1906, and an embodiment of coupled inductor 1700. The relatively small separation distance 1712 between solder tabs 1708, 1710 enables switching stages 1904, 1906 to be located close together while still being located close to ends of their respective windings 1702, 1704.

The alignment and/or length of windings 1702, 1704 can be varied during the design of coupled inductor 1700 to vary leakage inductance and/or magnetizing inductance. For example, magnetizing inductance may be increased by increasing portions of windings 1702, 1704 that are aligned with each other along lengthwise axis 1714 of windings 1702, 1704. As another example, leakage inductance associated with windings 1702, 1704 can be increased by increasing portions of windings 1702, 1704 that are offset from each other along axis 1714.

Figure 20:
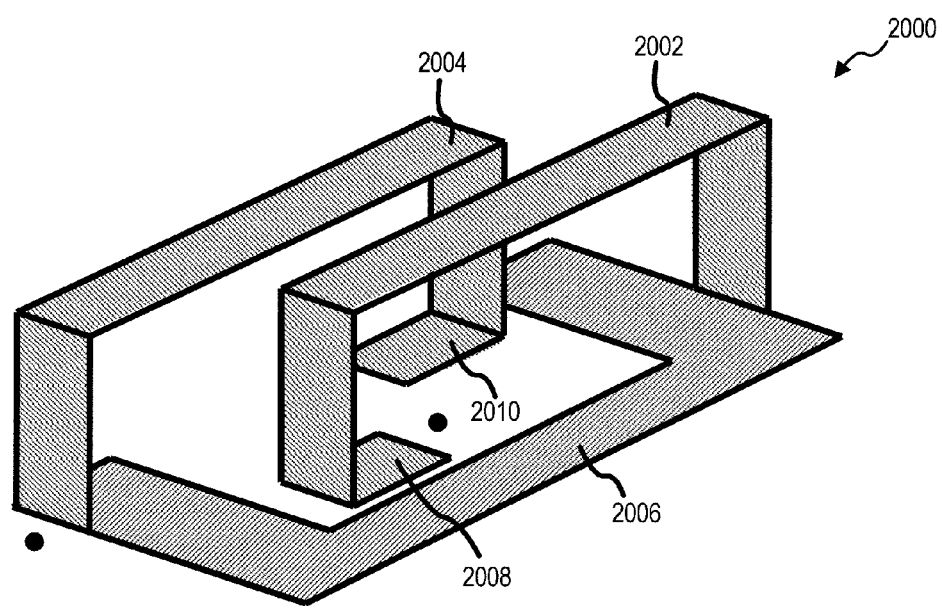
FIG. 20 shows a perspective view of another air core coupled inductor including two staple style windings, according to an embodiment.

FIG. 20 shows an air core coupled inductor 2000 including two staple style windings 2002, 2004 connected via a conductive common section 2006. Coupled inductor 2000 is similar to coupled inductor 1700 (FIG. 17) but differs in that windings 2002, 2004 of coupled inductor 2000 connect to the outside of common section 2006, while windings 1702, 1704 of coupled inductor 1700 connect to the inside of common section 1706. Therefore, for a given winding length and common section size, coupled inductor 2000 may have a smaller footprint than coupled inductor 1700. A distal end of each winding 2002, 2004 forms a solder tab 2008, 2010 configured for surface mount attachment to a PCB. In certain embodiments of coupled inductor 2000, windings 2002, 2004 and common section 2006 are part of a single piece of conductive foil.

Figure 21:
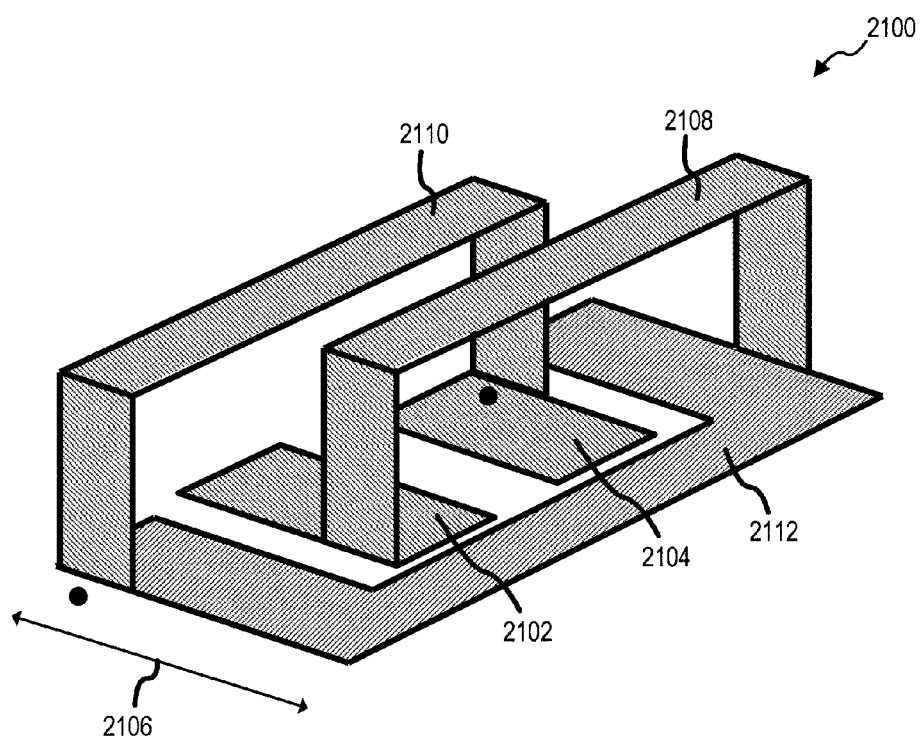
FIG. 21 shows a perspective view of yet another air core coupled inductor including two staple style windings, according to an embodiment.

FIG. 21 shows an air core coupled inductor 2100, which is similar to coupled inductor 2000 (FIG. 20), but with extended solder tabs 2102, 2104. Specifically, solder tabs 2102, 2104 extend along a widthwise axis 2106 in coupled inductor 2100. Such extended solder tabs may replace and/or supplement PCB circuit traces in applications where coupled inductor 2100 is installed on a PCB. Similar to coupled inductor 2000 (FIG. 20), coupled inductor 2100 includes two staple style windings 2108, 2110 connected via a conductive common section 2112. It is anticipated that in many embodiments of coupled inductor 2100, windings 2108, 2110 and common section 2112 will be part of a single piece of conductive foil.

Figure 22:
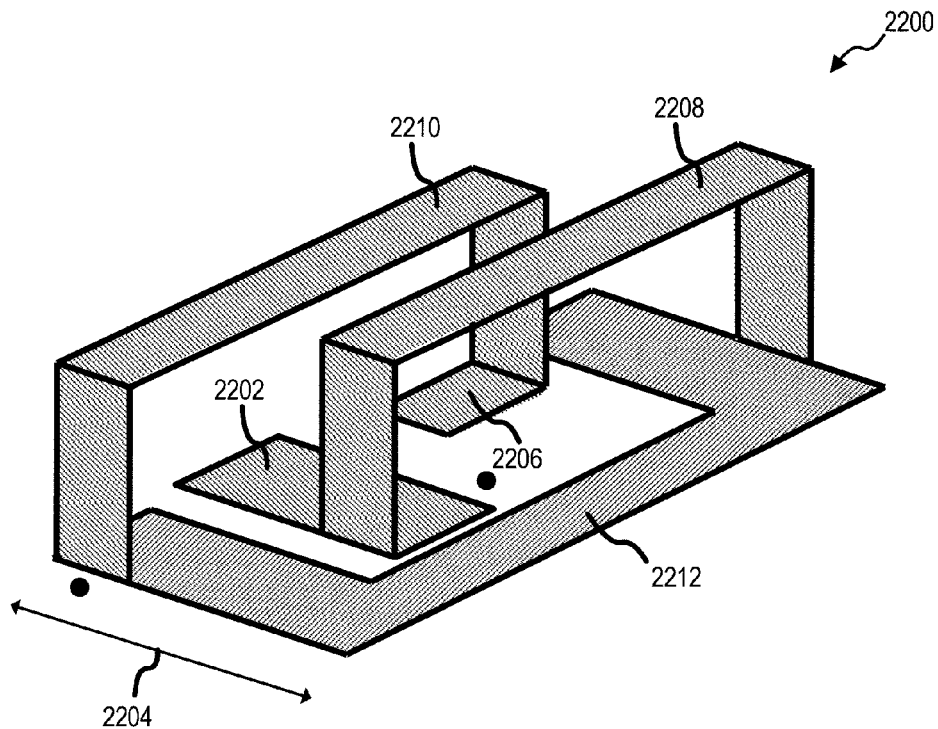
FIG. 22 shows a perspective view of another air core coupled inductor including two staple style windings, according to an embodiment.

FIG. 22 shows an air core coupled inductor 2200, which is similar to coupled inductor 2100 (FIG. 21), but where only one solder tab 2202 extends along a widthwise axis 2204 of coupled inductor 2200. Solder tab 2206, in contrast, has a configuration similar to that of solder tab 2010 (FIG. 20). Similar to coupled inductor 2000 (FIG. 20), coupled inductor 2200 includes a two staple style windings 2208, 2210 connected via a conductive common section 2212, and it is anticipated that each of such components will typically be part of a single piece of conductive foil.

Figure 23:
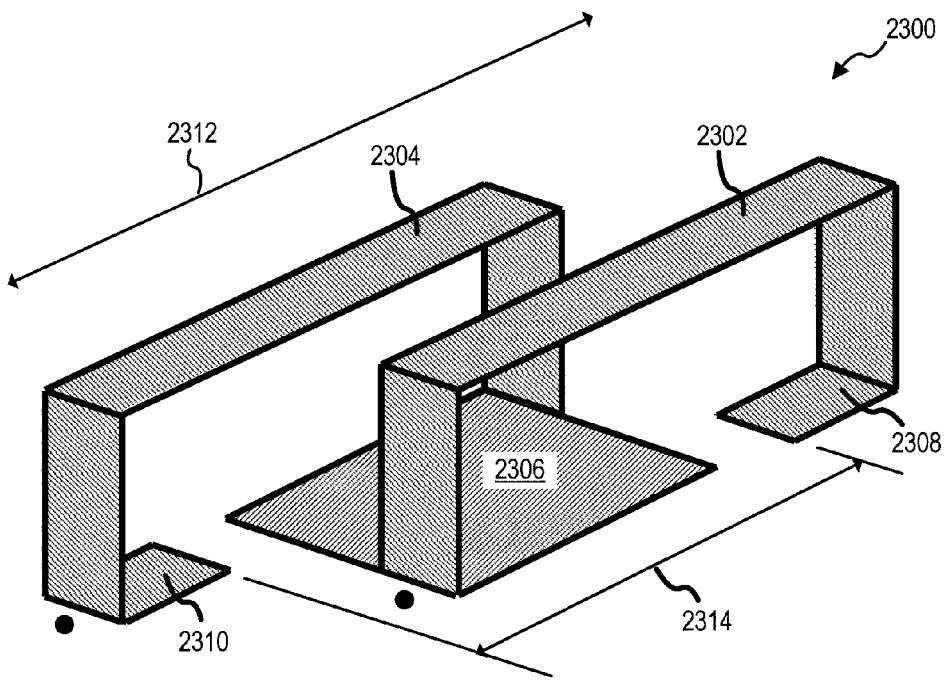
FIG. 23 shows a perspective view of another air core coupled inductor including two staple style windings, according to an embodiment.
Figure 24:
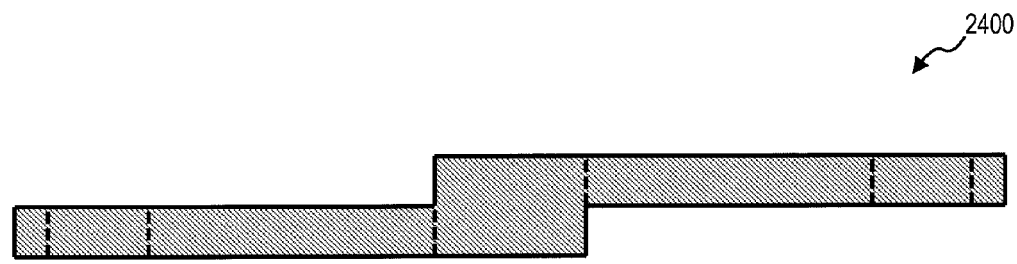
FIG. 24 shows a plan view of a strip of conductive foil prepared for bending into an embodiment of the coupled inductor of FIG. 23.

FIG. 23 shows another air core couple inductor 2300 including two staple style windings 2302, 2304 connected via a conductive common section 2306. It is anticipated that many embodiments of coupled inductor 2300 will be formed from a single piece of conductive foil. For example, FIG. 24 shows a plan view of a strip 2400 of conductive foil prepared for bending into an embodiment of coupled inductor 2300. The dashed lines (not labeled) indicate where strip 2400 is to be bent. Although strip 2400 is not rectangular, its shape still promotes efficient utilization of conductive foil, thereby promoting efficient resource utilization during manufacturing.

Returning to FIG. 23, a distal end of each winding 2302, 2404 forms a solder tab 2308, 2310 configured for surface mount attachment to a PCB. Conductive common section 2306 is configured for surface mount attachment to a PCB, and common section 2306 can therefore supplement or replace one or more PCB traces. If coupled inductor 2300 were used in a multi-phase buck converter, solder tab 2308 would typically be connected to a first switching node (e.g., switching node 422(1) of FIG. 4), solder tab 2310 would typically be connected to a second switching node (e.g., switching node 422(2) of FIG. 4), and common section 2306 would typically be connected to a common output node (e.g., output port 412 of FIG. 4).

Figure 25:
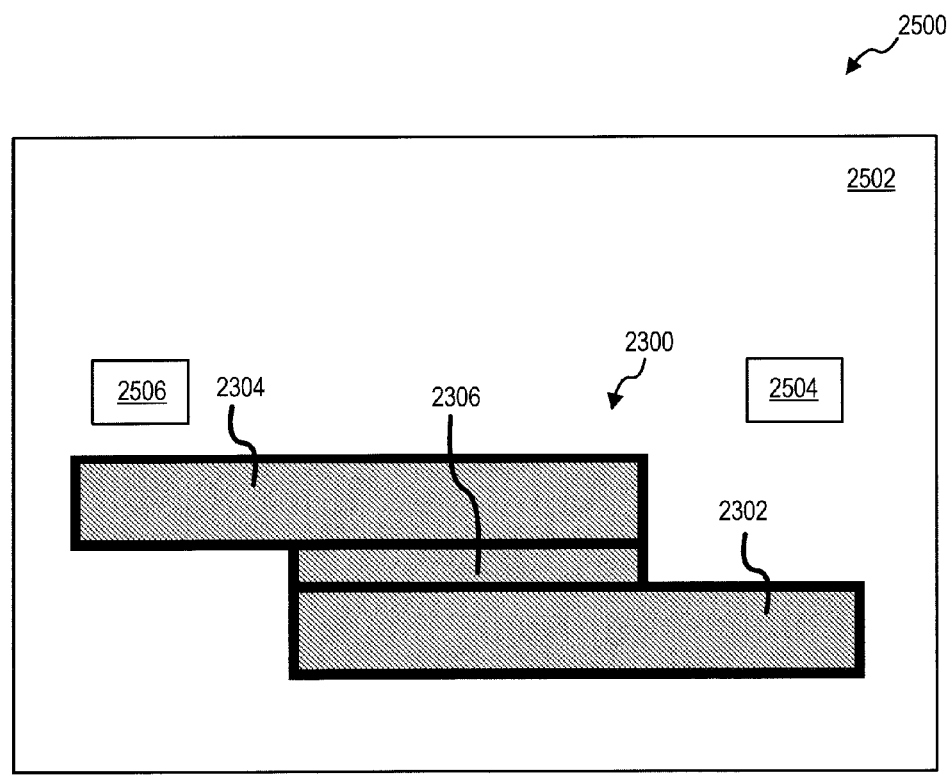
FIG. 25 shows a top plan view of a printed circuit assembly including an embodiment of the coupled inductor of FIG. 23.

It is anticipated that a separation distance 2314 between solder tabs 2308, 2310 will typically be relatively large. Accordingly, certain embodiments of coupled inductor 2300 may be well suited for applications where it is desired that switching stages be widely separated. FIG. 25 shows a top plan view of a printed circuit assembly 2500, which is one possible two-phase buck converter application of coupled inductor 2300. Assembly 2500 includes a PCB 2502, switching stages 2504, 2506, and an embodiment of coupled inductor 2300. The relatively large spacing 2314 between solder tabs 2308, 2310 enables switching stages 2504, 2506 to be located relatively far apart, while still being located close to ends of their respective windings 2302, 2304.

The alignment and/or length of windings 2302, 2304 can be varied during the design of coupled inductor 2300 to vary leakage inductance and/or magnetizing inductance. For example, magnetizing inductance may be increased by increasing portions of windings 2302, 2304 that are aligned with each other along lengthwise axis 2312 of windings 2302, 2304. As another example, leakage inductance associated with windings 2302, 2304 can be increased by increasing portions of windings 2302, 2304 that are offset from each other along axis 2312.

Figure 26:
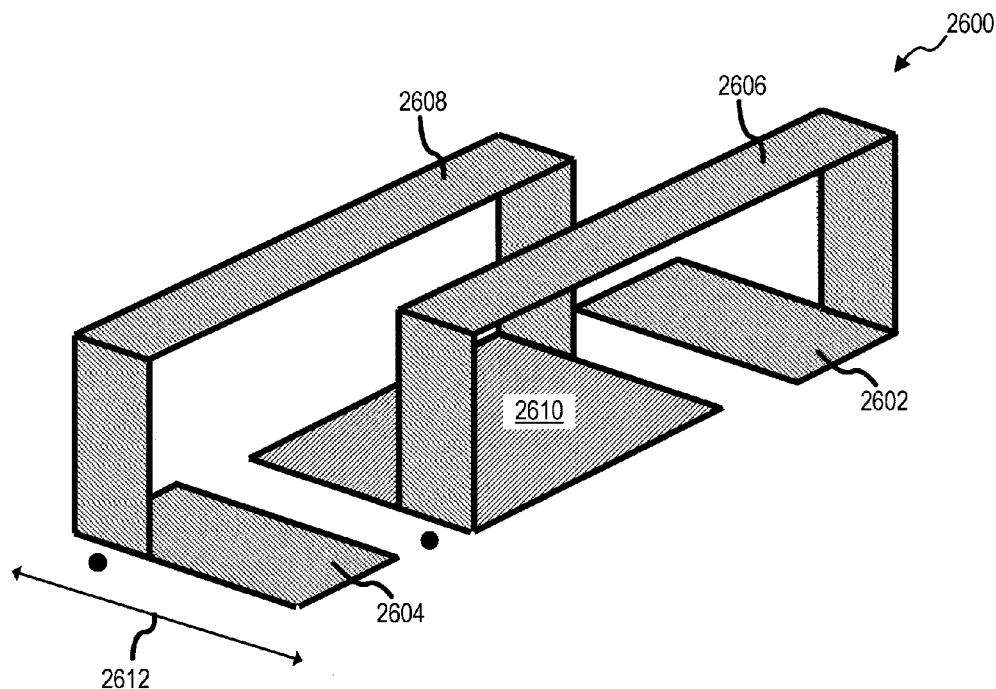
FIG. 26 shows a perspective view of another air core coupled inductor including two staple style windings, according to an embodiment.

FIG. 26 shows an air core coupled inductor 2600. Coupled inductor 2600 is similar to coupled inductor 2300 (FIG. 23) but includes extended solder tabs 2602, 2604. Coupled inductor 2600 includes staple style windings 2606, 2608 connected via a conductive common section 2610. A distal end of each winding 2606, 2608 forms a respective solder tab 2602, 2604 configured for surface mount attachment to a PCB. Solder tabs 2602, 2604 extend along a widthwise axis 2612 of coupled inductor 2600. Extended solder tabs 2602, 2604 may supplement or replace a PCB circuit trace in applications where coupled inductor 2600 is installed on a PCB. Windings 2606, 2608 and common section 2610 are, for example, part of a single piece of conductive foil, thereby promoting low cost and manufacturability of coupled inductor 2600.

Figure 27:
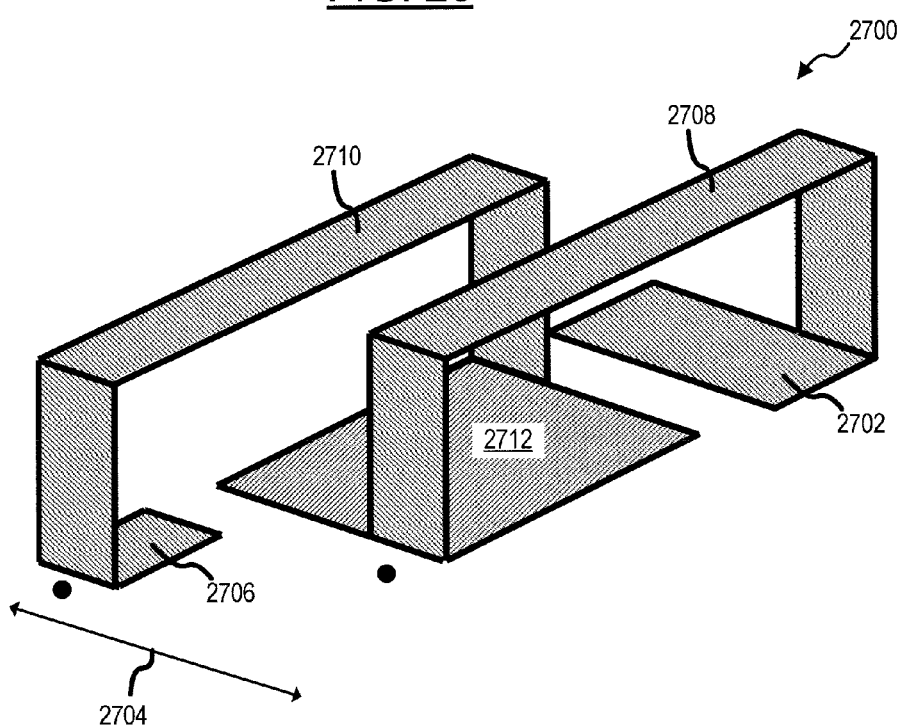
FIG. 27 shows a perspective view of another air core coupled inductor including two staple style windings, according to an embodiment

FIG. 27 shows another air core coupled inductor 2700, which is similar to coupled inductor 2600 (FIG. 26), but where only one solder tab 2702 extends along a widthwise axis 2704 of coupled inductor 2700. Solder tab 2706, in contrast, has a configuration similar to that of solder tab 2310 (FIG. 23). Similar to coupled inductor 2600 (FIG. 26), coupled inductor 2700 includes a two staple style windings 2708, 2710 connected via a conductive common section 2712, and it is anticipated that windings 2708, 2710 and common section 2712 will typically be part of a single piece of conductive foil.

Changes may be made in the above methods and systems without departing from the scope hereof. For example, particular alternative embodiments of coupled inductors 1100, 1400, 1500, and 1600 could have configurations that are mirror images of those shown in FIGS. 11, 14, 15, and 16, respectively. As another example, windings 1702, 1704 could trade positions along widthwise axis 1716 in an alternative embodiment of coupled inductor 1700 (FIG. 17). Similar modifications are possible in alternative embodiments of coupled inductors 2000, 2100, 2200, 2300, 2600, and 2700. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A switching power converter, comprising:
   a first and second switching device;
   an air core coupled inductor including:
      a first winding electrically coupled to the first switching device, and
      a second winding electrically coupled to the second switching device,
      the first and second windings magnetically coupled; and
   a controller operable to cause the first and second switching devices to repeatedly switch between their conductive and non-conductive states at a frequency of at least 100 kilohertz to cause current through the first and second windings to repeatedly cycle, thereby providing power to an output port.

2. The switching power converter of claim 1, the first and second windings being magnetically coupled without use of a magnetic core.

3. The switching power converter of claim 1, the controller operable to cause the first and second switching devices to switch out of phase with respect to each other.

4. The switching power converter of claim 1, further comprising:
   a first free wheeling device electrically coupled between a first end of the first winding and a reference node; and
   a second free wheeling device electrically coupled between a first end of the second winding and the reference node,
   the first switching device being electrically coupled between an input power port and the first end of the first winding,
   the second switching device being electrically coupled between the input power port and the first end of the second winding, and
   a second end of the first winding and a second end of the second winding being electrically coupled to the output port.

5. The switching power converter of claim 4, the first and second windings respectively comprising first and second printed circuit board traces, the first and second printed circuit board traces respectively forming at least partially overlapping first and second loops in the printed circuit board.

6. The switching power converter of claim 5, the first and second loops only partially overlapping.

7. The switching power converter of claim 4, the first and second windings respectively comprising first and second wires at least partially twisted together.

8. The switching power converter of claim 7, the first and second wires forming at least one offset cross sectional area where the first and second wires are not twisted together and are spaced apart, the at least one offset cross sectional area being disposed between portions of the first and second wires that are twisted together.

9. The switching power converter of claim 4, further comprising a printed circuit board, and the first and second windings respectively comprising first and second staple style windings affixed to the printed circuit board.

10. The switching power converter of claim 9, the first and second staple style windings being part of a single piece of conductive foil including a common section electrically coupled to the output port.

11. The switching power converter of claim 1, further comprising:
   a first free wheeling device electrically coupled between a second end of the first winding and the output port; and a second free wheeling device electrically coupled between a second end of the second winding and the output port, the first switching device being electrically coupled between the second end of the first winding and a reference node, the second switching device being electrically coupled between the second end of the second winding and the reference node, a first end of the first winding and a first end of the second winding being electrically coupled to an input power port.

12. The switching power converter of claim 11, the first and second windings respectively comprising first and second printed circuit board traces, the first and second printed circuit board traces respectively forming at least partially overlapping first and second loops in the printed circuit board.

13. The switching power converter of claim 12, the first and second loops only partially overlapping.

14. The switching power converter of claim 11, the first and second windings respectively comprising first and second wires at least partially twisted together.

15. The switching power converter of claim 14, the first and second wires forming at least one offset cross sectional area where the first and second wires are not twisted together and are spaced apart, the at least one offset cross sectional area being disposed between portions of the first and second wires that are twisted together.

16. The switching power converter of claim 11, further comprising a printed circuit board, and the first and second windings respectively comprising first and second staple style windings affixed to the printed circuit board.

17. The switching power converter of claim 16, the first and second staple style windings being part of a single piece of conductive foil including a common section electrically coupled to the input power port.

18. The switching power converter of claim 1, further comprising:
a first free wheeling device electrically coupled between a first end of the first winding and the output port; and
a second free wheeling device electrically coupled between a first end of the second winding and the output port,
the first switching device being electrically coupled between an input power port and the first end of the first winding,
the second switching device being electrically coupled between the input power port and the first end of the second winding, and
a second end of the first winding and a second end of the second winding being electrically coupled to a reference node.

19. The switching power converter of claim 18, the first and second windings respectively comprising first and second printed circuit board traces, the first and second printed circuit board traces respectively forming at least partially overlapping first and second loops in the printed circuit board.

20. The switching power converter of claim 19, the first and second loops only partially overlapping.

21. The switching power converter of claim 18, the first and second windings respectively comprising first and second wires at least partially twisted together.

22. The switching power converter of claim 21, the first and second wires forming at least one offset cross sectional area where the first and second wires are not twisted together and are spaced apart, the at least one offset cross sectional area being disposed between portions of the first and second wires that are twisted together.

23. The switching power converter of claim 18, further comprising a printed circuit board, and the first and second windings respectively comprising first and second staple style windings affixed to the printed circuit board.

24. The switching power converter of claim 23, the first and second staple style windings being part of a single piece of conductive foil including a common section electrically coupled to the reference node.

* * * * *